(12) United States Patent  
Hagar et al.

(10) Patent No.: US 9,028,605 B2
(45) Date of Patent: May 12, 2015

(54) COATING COMPOSITIONS COMPRISING SPHEROID SILICA OR SILICATE

(75) Inventors: William J. Hagar, Perryville, MD (US); Ronald L. Romer, Jarreltsville, MD (US); William C. Fultz, Rising Sun, MD (US); Karl W. Gallis, Perryville, MD (US)

(73) Assignee: J.M. Huber Corporation, Atlanta, GA (US)

( * ) Notice: Subject to any disclaimer, the term of this patent is extended or adjusted under 35 U.S.C. 154(b) by 88 days.

(21) Appl. No.: 13/398,230

(22) Filed: Feb. 16, 2012

(65) Prior Publication Data

US 2012/0216719 A1    Aug. 30, 2012

Related U.S. Application Data

(60) Provisional application No. 61/446,782, filed on Feb. 25, 2011.

(51) Int. Cl.
| | |
|---|---|
| *C04B 14/04* | (2006.01) |
| *C09D 7/12* | (2006.01) |
| *C09D 7/00* | (2006.01) |
| *E04F 15/10* | (2006.01) |

(52) U.S. Cl.
CPC .......... *C09D 7/1283* (2013.01); *Y10T 428/2982* (2015.01); *C09D 7/1291* (2013.01); *E04F 15/10* (2013.01); *C09D 7/00* (2013.01)

(58) Field of Classification Search
None
See application file for complete search history.

(56) References Cited

U.S. PATENT DOCUMENTS

| | | | | |
|---|---|---|---|---|
| 2,727,876 | A | * 12/1955 | Iler | ................................ 523/216 |
| 3,324,093 | A | 6/1967 | Alleman | |
| 3,987,096 | A | 10/1976 | Fuchs | |
| 4,001,379 | A | 1/1977 | Turk et al. | |
| 4,273,682 | A | 6/1981 | Kanamori | |
| 4,743,274 | A | 5/1988 | Ozawa et al. | |
| 4,767,433 | A | * 8/1988 | Iura et al. | ........................ 65/21.1 |
| 4,821,135 | A | 4/1989 | Nakanishi et al. | |
| 4,842,838 | A | 6/1989 | Chevallier | |
| 4,874,549 | A | 10/1989 | Michalchik | |
| 4,994,340 | A | 2/1991 | Yamazaki et al. | |
| 5,002,847 | A | 3/1991 | Utsumi et al. | |
| 5,030,286 | A | * 7/1991 | Crawford et al. | .............. 106/435 |
| 5,066,420 | A | 11/1991 | Chevallier | |
| 5,279,807 | A | 1/1994 | Moffett et al. | |
| 5,691,095 | A | 11/1997 | Shinzo et al. | |

(Continued)

FOREIGN PATENT DOCUMENTS

| | | |
|---|---|---|
| DE | 10248799 A1 | 5/2004 |
| EP | 0610136 A1 | 8/1994 |

(Continued)

OTHER PUBLICATIONS

Asahi Glass Company Si-Tech Co., Ltd. "Product Information Sunsphere/Solesphere®"; http://www.agc-si.com/en/product_sunsphere.shtml.*

(Continued)

*Primary Examiner* — Kaj K Olsen
*Assistant Examiner* — Ross J Christie
(74) *Attorney, Agent, or Firm* — Merchant & Gould

(57) ABSTRACT

Disclosed herein are architectural coating compositions comprising spheroid shaped silica or silicate. The compositions exhibit a number of improved properties and are useful on a variety of substrates.

24 Claims, 23 Drawing Sheets

(56) References Cited

U.S. PATENT DOCUMENTS

| | | | |
|---|---|---|---|
| 5,726,258 | A | 3/1998 | Fischer et al. |
| 5,853,616 | A | 12/1998 | Moffett et al. |
| 5,869,028 | A | 2/1999 | McGill et al. |
| 6,114,430 | A * | 9/2000 | Paulson et al. ............... 524/432 |
| 6,221,326 | B1 | 4/2001 | Amiche |
| 6,231,955 | B1 | 5/2001 | Endo |
| 6,274,112 | B1 | 8/2001 | Moffett et al. |
| 6,403,059 | B1 | 6/2002 | Martin et al. |
| 6,406,789 | B1 | 6/2002 | McDaniel et al. |
| 6,416,917 | B1 | 7/2002 | Nakanishi et al. |
| 6,419,174 | B1 | 7/2002 | McGill et al. |
| 6,616,916 | B1 | 9/2003 | Karpe et al. |
| 6,652,611 | B1 | 11/2003 | Huang et al. |
| 6,860,913 | B2 | 3/2005 | Huang |
| 6,946,010 | B2 | 9/2005 | Huang |
| 7,214,459 | B2 | 5/2007 | Iizuka et al. |
| 7,255,852 | B2 | 8/2007 | Gallis et al. |
| 7,267,814 | B2 | 9/2007 | McGill et al. |
| 7,270,803 | B1 | 9/2007 | McGill |
| 7,303,742 | B2 | 12/2007 | McGill et al. |
| 7,306,788 | B2 | 12/2007 | McGill et al. |
| 8,609,068 | B2 | 12/2013 | Hagar et al. |
| 2002/0174805 | A1* | 11/2002 | Terase et al. ............... 106/737 |
| 2003/0228369 | A1* | 12/2003 | Kuhrts ............... 424/489 |
| 2005/0129628 | A1 | 6/2005 | Stanier et al. |
| 2006/0110307 | A1 | 5/2006 | McGill et al. |
| 2006/0110336 | A1 | 5/2006 | McGill et al. |
| 2006/0110338 | A1 | 5/2006 | McGill et al. |
| 2006/0110339 | A1* | 5/2006 | McGill et al. ............... 424/49 |
| 2006/0180936 | A1* | 8/2006 | Japp et al. ............... 257/762 |
| 2007/0224133 | A1 | 9/2007 | McGill |
| 2007/0253987 | A1* | 11/2007 | Wozniak et al. ............... 424/401 |
| 2007/0258922 | A1* | 11/2007 | Wozniak et al. ............... 424/63 |
| 2009/0010973 | A1 | 1/2009 | Stanier |
| 2009/0048407 | A1 | 2/2009 | Barbieri et al. |
| 2009/0053524 | A1 | 2/2009 | Yamada et al. |
| 2009/0118478 | A1 | 5/2009 | Payne et al. |
| 2010/0047742 | A1* | 2/2010 | Pitcock et al. ............... 433/215 |
| 2011/0206746 | A1* | 8/2011 | Hagar et al. ............... 424/401 |
| 2014/0072634 | A1 | 3/2014 | Hagar et al. |

FOREIGN PATENT DOCUMENTS

| | | |
|---|---|---|
| EP | 1447433 A1 | 8/2004 |
| WO | WO-96/34592 A1 | 11/1996 |
| WO | WO-96/34593 A1 | 11/1996 |
| WO | WO-97/40105 A1 | 10/1997 |
| WO | WO-01/46073 A1 | 6/2001 |
| WO | WO-03/044100 A1 | 5/2003 |
| WO | WO-03/055802 A1 | 7/2003 |
| WO | WO-2007/064053 A1 | 6/2007 |
| WO | WO-2009/072218 A1 | 6/2009 |
| WO | WO-2009/140577 A1 | 11/2009 |

OTHER PUBLICATIONS

Asahi Glass Company Si-Tech Co., Ltd. "Applications Functional filler Sunsphere®"; http://www.agc-si.com/en/use_functional.shtml.*
Asahi Glass Company Si-Tech Co., Ltd., "Company Profile History"; http://www.agc-si.com/en/profile_history.shtml.*
Asahi Glass Company Si-Tech Co., Ltd. "Product Information Sunsphere/Solesphere®"; Internet Archives Wayback Machine (Oct. 20, 2007).*
Barreiros et al. "Calculating Shape Factors from Particle Sizing Data" Part. Part. Syst. Charact. (1996) 13 368-373.
Pabst et al. "Characterization of particles and particle systems," ICT Prague 2007.
Viswanathan et al. "Estimation of Specific Surface Area and Shape Factors" Ind. Eng. Chem. Process Des. Dev. (1982) 21, 345-348.
International Search Report and Written Opinion issued on Dec. 1, 2011 for Intl. App. No. PCT/US2011/025626, filed on Feb. 21, 2011 (First Inventor—Hagar; Applicant—J.M. Huber Corporation; pp. 1-26).
International Preliminary Report on Patentability issued on Nov. 4, 2012 for for Intl. App. No. PCT/US2011/025626, filed on Feb. 21, 2011 (First Inventor—Hagar; Applicant—J.M. Huber Corporation; pp. 1-11).
Restriction Requirement issued on Apr. 4, 2012 for U.S. Appl. No. 12/711,321, filed Feb. 24, 2010 (Inventor—Hagar et al.; pp. 1-6).
Response to Restriction Requirement filed on May 2, 2012 for U.S. Appl. No. 12/711,321, filed Feb. 24, 2010 (Inventor—Hagar et al.; pp. 1-2).
Restriction Requirement issued on May 21, 2012 for U.S. Appl. No. 12/711,321, filed Feb. 24, 2010 (Inventor—Hagar et al.; pp. 1-6).
Response to Restriction Requirement filed on Jun. 21, 2012 for U.S. Appl. No. 12/711,321, filed Feb. 24, 2010 (Inventor—Hagar et al.; pp. 1-3).
International Search Report and Written Opinion issued on Apr. 25, 2012 for Intl. App. No. PCT/US2012/026426, filed on Feb. 24, 2012 (First Inventor—Hagar; Applicant —J.M. Huber Corporation; pp. 1-12).
Non-Final Office Action issued on Feb. 11, 2013 for U.S. Appl. No. 12/711,321, filed Feb. 24, 2010 (Inventor—Hagar et al.; pp. 1-9).
Response to Non-Final Office Action filed on Jun. 11, 2013 for U.S. Appl. No. 12/711,321, filed Feb. 24, 2010 (Inventor—Hagar et al.; pp. 1-16).
Notice of Allowance issued on Aug. 13, 2013 for U.S. Appl. No. 12/711,321, filed Feb. 24, 2010 (Inventor—Hagar et al.; pp. 1-9).
AGC Sunsphere Product Information, printed Nov. 5, 2014, 2 pages.
AGC Sunsphere NP-Series Technical Information, printed Nov. 5, 2014, 1 page.

* cited by examiner

COATING COMPOSITIONS COMPRISING SPHEROID SILICA OR SILICATE

CROSS REFERENCE TO RELATED APPLICATIONS

This application claims priority to U.S. Provisional Patent Application No. 61/446,782, filed on Feb. 25, 2011, which is hereby incorporated by reference in its entirety.

BACKGROUND

1. Technical Field

The present disclosure relates to architectural coating compositions comprising silica/silicate particles.

2. Technical Background

The coatings industry faces significant challenges to reduce or eliminate volatile organic content (VOC's) and alkylphenol ethoxylates (APEO's) from paint formulations. Volatile organic solvents are used to thin paints, modify the drying properties, and assist in forming of a coating film. APEO's include common wetting/dispersant chemicals that are critical to the dispersion and stabilization of pigments.

There are two primary reasons behind the trend to eliminate VOCs and APEOs. First, these raw materials are now being regulated at the local, State, and Federal levels. Second, aside from regulatory concerns, coatings producers are finding tremendous value in obtaining "green" certifications that have value and appeal to consumers. For these reasons, coatings producers now have limited materials with which to meet more challenging and restrictive formulating guidelines.

Generally, the available alternative materials fall short in performance and are more costly than the preferred materials that are currently being phased out. Coatings producers are now looking to the raw materials industry to provide new materials and technologies to replace the VOC and APEO containing compounds.

SUMMARY

Disclosed herein are architectural coating compositions comprising silica/silicate particles having a particle size of from 3 to 15 µm, and an oil absorption value of greater than 100 cc/100 g.

Also disclosed herein are architectural coating compositions comprising silica/silicate particles having an oil absorption value of up to 100 cc/100 g; wherein at least 80% of the silica particles are rounded to well rounded; and wherein the silica particles have a sphericity ($S_{80}$) factor of greater than 0.9 and a Brass Einlehner Abrasion value of less than 8.0 mg lost/100,000 revolutions.

Also disclosed herein are architectural coating compositions comprising a silica and/or silicate product, the silica and/or silicate product prepared by a process comprising: (a) continuously feeding an acidulating agent and an alkali metal silicate into a loop reaction zone comprising a stream of liquid medium; wherein at least a portion of the acidulating agent and the alkali metal silicate react to form a silica and/or silicate product in the liquid medium of the loop reaction zone; (b) continuously recirculating the liquid medium through the loop reaction zone; and (c) continuously discharging from the loop reaction zone a portion of the liquid medium comprising the silica and/or silicate product.

DETAILED DESCRIPTION

Figure 1:
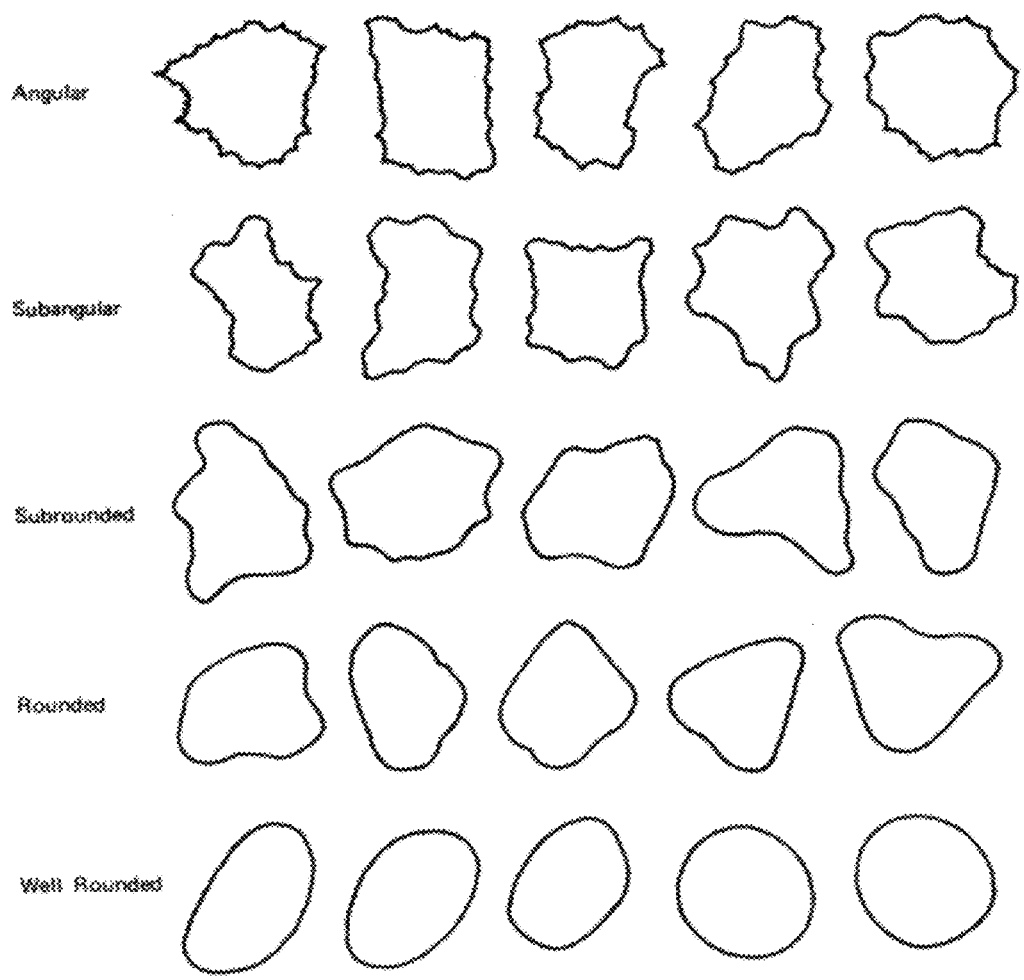
FIG. 1 is a graphical representation of particle roundness.

As used herein, an "architectural coating composition" refers to any liquid, liquefiable, or mastic composition comprising the disclosed silica or silicate, which after application to a substrate is converted to a solid film. The coating composition can be applied to the interior or exterior of any structure.

The disclosed coating compositions comprise silica or silicate products prepared by a continuous process. The compositions reduce the environmental impact of the coatings by reducing or even eliminating VOCs and/or APEOs that are commonly used in coating compositions, while maintaining important performance characteristics of the coatings.

The silica and silicate products described herein have unique particle characteristics including hardness, low surface area, spheroid shape and desirable oil absorption, which are useful to reduce VOC and APEO demand of coating compositions. Further environmental benefits are also realized by the disclosed compositions, as the process for preparing the compositions requires significantly less water and energy to process into finished coating.

As briefly discussed above, the coating composition can be any coating composition and can be applied to any substrate. The compositions can be readily used as traffic paints as they exhibit excellent wear resistance properties while maintaining integrity of the polymer and pigment matrix that can be present in the coating. The compositions are also useful as automotive interior coatings as they exhibit enhanced mar and burnish resistance. Examples of such coatings include clearcoats, deep color coats, black basecoats, or monocoats. In addition, the compositions are useful as residential or commercial paints and can be applied to the interior or exterior of any surface, as they exhibit desirable scrub resistance properties. The compositions are also useful as flooring coatings, e.g., for synthetic or composite flooring materials.

The compositions disclosed herein are also useful in plastic compound and masterbatch formulations as they enhance physical properties of the formulation as well as exhibit good impact resistance, improved flow, improved extrusion and molding properties. The compositions also reduce splay, knit lines, and other surface imperfections in formed plastic parts. Likewise, the compositions are useful in plastisol formulations, for enhancing properties for coil coatings, graphic arts, and formed or molded plastics. The compositions exhibit wear resistance, as discussed above, as well as flexibility and good rheological properties such as improved transfer characteristics. Such compositions can be applied to a substrate by silk screen or other methods for labeling and decoration on clothing and/or packaging.

The coating compositions comprise the disclosed silica and/or silicate products in addition to various other ingredients used in coating compositions. Examples of ingredients that can be present in the compositions include cellulosic thickeners, such as NATROSOL, anionic dispersants, such as TAMOL, surface wetting agents, such as TERGITOL, defoamers, such as FOAMASTER, preservatives, such as KATHON 1x, fillers, such as titanium dioxide, diatomaceous fillers and flatteners, such as DIAFIL, other fillers and opacifiers, such as calcined clay, acrylic binder resins, such as LATEX, coalescents, such as ester alcohol coalescing solvents, freeze thaw stabilizers and other stabilizers, thickeners, such as urethane thickeners. Binders that can be included in the compositions include without limitation synthetic or natural resins such as alkyds, acrylics, vinyl-acrylics, vinyl acetate/ethylene (VAE), polyurethanes, polyesters, melamine resins, epoxy, or oils.

The balance of the composition is typically water and/or propylene glycol. Other diluents can also be included aside from water, such as aliphatics, aromatics, alcohols, ketones, white spirit, petroleum distillate, esters, glycol ethers, low-molecular weight synthetic resins, and the like. Environmentally friendly diluents, such as water, are preferred.

Other miscellaneous additives can also be included in the compositions, including without limitation, additives to modify surface tension, improve flow properties, improve finished appearance, increase wet edge, improve pigment stability, impart antifreeze properties, control foaming, control skinning, etc. Further additives that can be included in the compositions include without limitation catalysts, thickeners, stabilizers, emulsifiers, texturizers, adhesion promoters, UV stabilizers, de-glossing agents, biocides to fight bacterial growth, and the like. Oil can be included as a rheology agent, gloss modifier and protective agent that will reduce damage to the coating that would otherwise result from forming processes and from degrative elements in the service environment of the coated materials.

The coating compositions are prepared by methods known in the art and methods discussed below.

The silica and silicate particles and products included within the disclosed coating compositions, and methods of making the silica particles and products, are described in detail in U.S. Patent Publication No. 2011/0206746 (application Ser. No. 12/711,321), entitled "CONTINUOUS SILICA PRODUCTION PROCESS AND SILICA PRODUCT PREPARED FROM SAME," which is incorporated herein by reference in its entirety and for the purpose of disclosing silica particles and methods for making such particles. In one aspect, the specific products or particles, as well as the method for making these products and particles, can be any and all of those disclosed in the US 2011/0206746 publication.

The process for preparing the silica and silicate involves continuously feeding an acidulating agent and an alkali metal silicate into a loop reaction zone comprising a stream of liquid medium; wherein at least a portion of the acidulating agent and the alkali metal silicate react to form a silica product in the liquid medium of the loop reaction zone. As the acidulating agent and alkali metal silicate are continuously fed into the loop reaction zone, the contents of the loop reaction zone (i.e., the liquid medium) are continuously recirculated. Silica or silicate product is collected by discharging a portion of the liquid medium that contains the silica or silicate product, which in one aspect is equal to the volume of raw materials added to the into the loop reaction zone.

As used herein, the "loop reaction zone" refers to an area inside a reactor that forms a continuous circuit that contains the recirculating liquid medium wherein the acidulating agent and the alkali metal silicate react to form the silica or silicate product. As will be discussed below, in one aspect, the loop reaction zone is defined by walls of a continuous loop of one or more loop reactor pipes. Generally, the liquid medium in the loop reaction zone will vary in composition depending on the stage of the process. Prior to adding the acidulating agent and alkali metal silicate into the liquid medium, the medium can contain only water or a suitable aqueous solution or dispersion (slurry). In one aspect, prior to feeding the acidulating agent and the alkali metal silicate into the reaction zone, the liquid medium can contain seed silica, which can serve to reduce gelation in the loop reaction zone and assist in forming the silica or silicate product. In a specific aspect, prior to adding acidulating agent and alkali metal silicate, precipitated silica or silicate, sodium sulfate, sodium silicate, and water can first be added to the loop reaction zone and recirculated as desired, after which acidulating agent and alkali metal silicate can be added. As acidulating agent and alkali metal silicate are fed into the loop reaction zone, silica or silicate product forms in the liquid reaction medium. The silica or silicate product will generally be a precipitated product, and thus will be a dispersed phase in the liquid reaction medium. In one aspect, prior to collecting desired silica or silicate product, the seed silica or silicate product can be purged from the loop reaction zone.

The process temperature and pressure can also vary widely and can depend on what type of silica or silicate product is desired. In one aspect of the process, a temperature of from about ambient temperature to about 130° C. is maintained in the liquid medium. Likewise, a variety of pressures can be used. The pressure can range from atmospheric pressure to higher pressures. For example, when a continuous loop reactor is used with the process, the reactor can be fitted with a back-pressure valve for controlling a wide range of pressures inside the reactor.

The alkali metal silicate and acidulating agent can be fed into the reaction zone at various rates. The rate of addition of the alkali metal silicate is generally such that a desired concentration of silicate is maintained in the reaction zone, whereas the rate of addition of the acidulating agent is such that a desired pH is maintained in the loop reaction zone. In one aspect, the alkali metal silicate is fed into the loop reaction zone at a rate of at least 0.5 L/min. The maximum alkali metal silicate addition rate will vary widely depending on the volume of the loop reaction zone and scale of the silica production process. A high silicate addition rate could be desired, for example, in a very large scale process wherein a large volume of reactants are being used. In one specific example, the alkali metal silicate is fed at a rate of from 0.5 to 5 L/min, or from 0.5 to 3 L/min.

The acidulating agent is generally fed into the loop reaction zone at a rate sufficient to maintain a pH of from 2.5 to 10.5 in the liquid medium. In other aspects, the acidulating agent is fed into the loop reaction zone at a rate sufficient to maintain a pH of from 7.0 to 10 in the liquid medium, or from 7.0 to 8.5 in the liquid medium. For example, in a specific aspect, a pH of about 7.5 is maintained in the liquid medium. The pH of the liquid medium can be monitored by any conventional pH sensitive electrode. In some examples, the pH of the liquid medium can be evaluated by directly measuring the pH of the liquid medium (slurry). In these examples, the pH of the liquid reaction medium will generally range from 2.5 to 10.5, from 6 to 10, or from 7 to 8.5.

The liquid medium can be recirculated at various rates, depending on the conditions present in the loop reaction zone, such as degree of mixing or shear present in the reaction zone, and depending on the scale of the production process. Generally, the liquid medium is recirculated through the loop reaction zone at a rate of at least 15 L/min. In a specific example, the liquid medium can be recirculated through the loop reaction zone at a rate of from 15 to 100 L/min, from 30 to 80 L/min, or from 70 to 80 L/min.

A variety of acidulating agents can be used, including various acids and other agents capable of reacting with the alkali metal silicate to form the silica or silicate product. The acid, or acidulating agent, can be a Lewis acid or Brönsted acid, such as a strong mineral acid, for example, sulfuric acid, hydrochloric acid, nitric acid, phosphoric acid, and so forth. Such acids can be added into the reaction zone as dilute solutions. As a specific example, a 6 to 35% by weight, and more preferably a 10 to 17% by weight solution of sulfuric acid as acidulating agent can be fed into the loop reaction zone. In other aspects, a gas such as $CO_2$, can be used as the acidulating agent. Carbon dioxide produces a weak acid (carbonic acid), and thus it can be desirable for the liquid medium to be kept at a pH target of greater than about 8.5 when such a weak acid is used.

The acidulating agent can be selected based on the type of silica or silicate product that is desired. For example, an acidic solution of aluminum sulfate can be used as the acidulating agent, and the resulting silica or silicate product will therefore be an alkali aluminosilicate. As a specific example, aluminum sulfate can be added to sulfuric acid, and this mixture can be used as the acidulating agent.

Any suitable alkali metal silicate can be used with the process of the invention, including both metal silicates, disilicates, and the like. Water soluble potassium silicates and sodium silicates are particularly preferred. In general, acceptable silica products of this invention can be made with silicates having various alkali metal:silicate molar ratios. For a sodium silicate, for example, the molar ratio, $Na_2O:SiO_2$, will generally range from about 1:1 to 1:3.5 and preferably from about 1:2.4 to about 1:3.4. The alkali metal silicate fed into the loop reaction zone is preferably fed as an aqueous solution, similar to the acidulating agent. The alkali silicate solution fed into the loop reaction zone generally can contain between about 8 to 35%, and more preferably between about 8% and 20% by weight alkali metal silicate based on the total weight of the alkali metal silicate solution fed into the loop reaction zone.

When desired, and in order to reduce the alkali silicate or acidulating agent concentration of a source solution, dilution water can be added to the source solution before the solution is fed into the loop reaction zone, and/or the dilution water can be added separately into the loop reaction zone and subsequently mixed with the alkali metal silicate and/or acidulating agent and any other liquid medium contents.

As the desired quantity of acidulating agent and alkali metal silicate are added into the loop reaction zone, the liquid medium will generally be recirculated on average a minimum of three passes through the recirculation zone. The number of times the liquid medium is recirculated through the loop reaction zone, on average, is referred to herein as the "mean number of passes," which is calculated according to the following equations. The residence time of the silica or silicate product in the recirculation loop before discharge is calculated by dividing the reaction system volume by the raw material addition rate (alkali metal silicate addition rate+ acidulating agent addition rate). The number of passes/ minute can then be calculated by dividing the recirculation rate by the total system volume. The residence time can then be multiplied by the number of passes/minute to get the mean number of passes.

$$\text{residence time (min)} = \frac{\text{system volume(L)}}{\text{combined raw material addition rate(L/min)}}$$

$$\text{number of passes/min} = \frac{\text{recirculation rate(L/min)}}{\text{system volume(L)}}$$

$$\text{residence time(min)} \times \frac{\text{number of passes}}{(\text{min})} = \text{mean number of passes}$$

The silica or silicate product can be recirculated such that the mean number of passes is from 3 to 200, or from 10 to 200. Generally, the higher the mean number of passes, the more spherical and rounded the silica or silicate product becomes. The number of recirculation passes (mean number of passes) can therefore be selected based on the type of silica or silicate product that is desired.

Silica or silicate product can be discharged from the loop reaction through various mechanisms. In one aspect, a continuous loop reactor is used in the process, as discussed below, which can contain a valve for releasing the silica or silicate product from the loop reaction zone. Preferably, however, silica or silicate product is displaced from the loop reaction zone by adding additional liquid into the reaction zone such that a portion of the liquid medium containing the silica or silicate product is discharged from the reaction zone (i.e., the reaction zone is overflowed). This can be accomplished in one aspect by continuously adding acidulating agent and/or alkali metal silicate into the loop reaction zone as a portion of the liquid medium is volumetrically displaced by the volume of acidulating agent and/or alkali metal silicate that is being added.

In some aspects of the process, the acidulating agent and alkali metal silicate are continuously added while the liquid reaction medium is being recirculated and while silica or silicate product is being discharged. Thus, in one aspect, each step of the process occurs continuously and simultaneously. In a further aspect, the acidulating agent and alkali metal silicate are each fed into the loop reaction zone simultaneously. The acidulating agent and alkali metal silicate are preferably added to the loop reaction at different points along the loop reaction zone. For example, alkali metal silicate can be added upstream in the loop relative to the acidulating agent, such that as the acidulating agent is being fed into the reaction zone, alkali metal silicate is already present.

Modifications to the structure of the silica or silicate product can be achieved by modifications to temperature, ionic strength, addition rates, and energy input. Generally, changes in temperature, recirculation rate, and acidulating agent/alkali metal silicate addition rates result in the largest changes to the physical properties of the silica or silicate products. Generally, the more the liquid medium is recirculated, the longer the residence time of the silica or silicate product in the recirculation loop (slower addition rates), and the higher the temperature, the lower the structure (as defined by oil absorption) of the resulting silica or silicate product. Manipulations to the pH in the liquid medium were observed to minimize silica or silicate deposits (fouling) within the loop reaction zone when a pH of below about 9.0 was used.

The silica or silicate product can be collected after being discharged from the loop reaction zone in a suitable vessel and processed as desired. In some aspects, the silica or silicate product requires no further processing (other than washing to remove salts, etc.) and can be shipped as a wet cake or can be dried as desired. In one aspect, for example, the resulting silica or silicate product can be spray dried according the methods known in the art. Alternatively, a wet cake of the silica or silicate product can be obtained and can be reslurried and handled and supplied in slurry form or supplied as a filter cake, directly. Generally, drying of the silica or silicate product described herein can be effected by any conventional equipment used for drying silica or silicate, e.g., spray drying, nozzle drying (e.g., tower or fountain), flash drying, rotary wheel drying or oven/fluid bed drying. The dried silica or silicate product generally should have a 1 to 15 wt. % moisture level. The nature of the silica or silicate reaction product and the drying process both are known to affect the bulk density and liquid carrying capacity.

In other aspects, the silica or silicate product can be subjected to various treatments, depending on the nature of the desired silica or silicate product. For example, after the silica or silicate product is collected, the pH of the silica or silicate slurry can be adjusted, e.g., lowered using an acid such as sulfuric acid, following by filtering and washing. In this example, the silica or silicate product can be washed to a desired conductivity, for example, from 1500 µS to 2000 µS, followed by drying as discussed above.

To decrease the size of the dried silica or silicate product further, if desired, conventional grinding and milling equipment can be used. A hammer or pendulum mill may be used in one or multiple passes for comminuting and fine grinding can be performed by fluid energy or air-jet mill. Products ground to the desired size may be separated from other sizes by conventional separation techniques, e.g., cyclones, classifiers or vibrating screens of appropriate mesh sizing, and so forth.

There are also ways to reduce the particle size of the resulting silica or silicate product before isolation and/or during the synthesis of the silica or silicate product that affect the size of the dried product or product in slurry form. These include but are not limited to media milling, the use of high shear equipment (e.g., high shear pump or rotor-stator mixers), or ultrasound devices, which in some aspects, can be used during the production process itself, for example in the recirculation loop. Particle size reduction carried out on the wet silica or silicate product can be done at anytime before drying.

A variety of types of silica or silicate product can be prepared using the process described above, depending on the starting materials and process conditions. In one aspect, the silica or silicate products of the invention are silica or silicate particles having an oil absorption value of up to 100 cc/100 g. In this aspect, at least 80% of the silica or silicate particles are rounded to well rounded. These silica or silicate particles also have a sphericity ($S_{80}$) factor of greater than 0.9 and a Brass Einlehner Abrasion value of less than 8.0 mg lost/100,000 revolutions.

As used herein "rounded" particles are those having gently rounded corners with flat faces and small reentrants nearly absent. "Well rounded" particles are those having a uniform convex grain outline with no flat faces, corners, or reentrants discernable.

Characterization of the silica or silicate particles of the invention as rounded to well rounded is carried out according to the following procedure. A representative sample of silica or silicate particles is collected and examined by scanning electron microscopy (SEM). Pictures are taken at two different magnification levels that are representative of the entire image. The first image is taken at a magnification of approximately 200 times and is used to get a sense of the sample homogeneity. Next, an SEM image with a magnification of approximately 20,000 is evaluated. Preferably, there should be a minimum of approximately 20 particles that are shown in the image and care should be taken to insure the picture is representative of the sample as a whole. The particles in this image are then evaluated and characterized by class according to Table 1. At least 80% of the particles of the invention that have oil absorption values up to 100 cc/100 g can be characterized as rounded to well rounded.

TABLE 1

Particle roundness characterization

| Class | Description |
| --- | --- |
| Angular | Strongly developed faces with sharp corners. Sharply defined, large reentrants with numerous small reentrants. |
| Subangular | Strongly developed flat faces with incipient rounding of corners. Small reentrants subdued and large reentrants preserved. |
| Subrounded | Poorly developed flat faces with corners well rounded. Few small and gently rounded reentrants, and large reentrants weakly defined. |
| Rounded | Flat faces nearly absent with corners all gently rounded. Small reentrants absent. |
| Well Rounded | No flat faces, corners or reentrants discernible, and a uniform convex grain outline. |

Figure 2A:
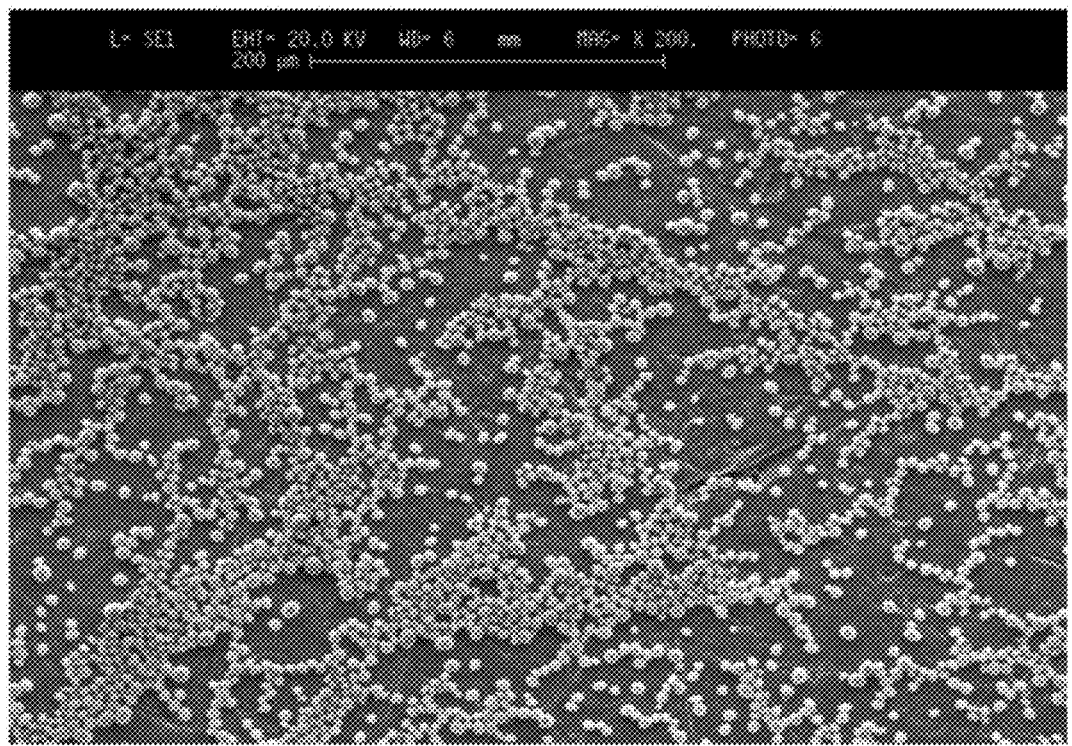
FIGS. 2A and 2B are Scanning Electron Micrographs (SEM) of material prepared in accordance with various aspects of the present invention.
Figure 2B:
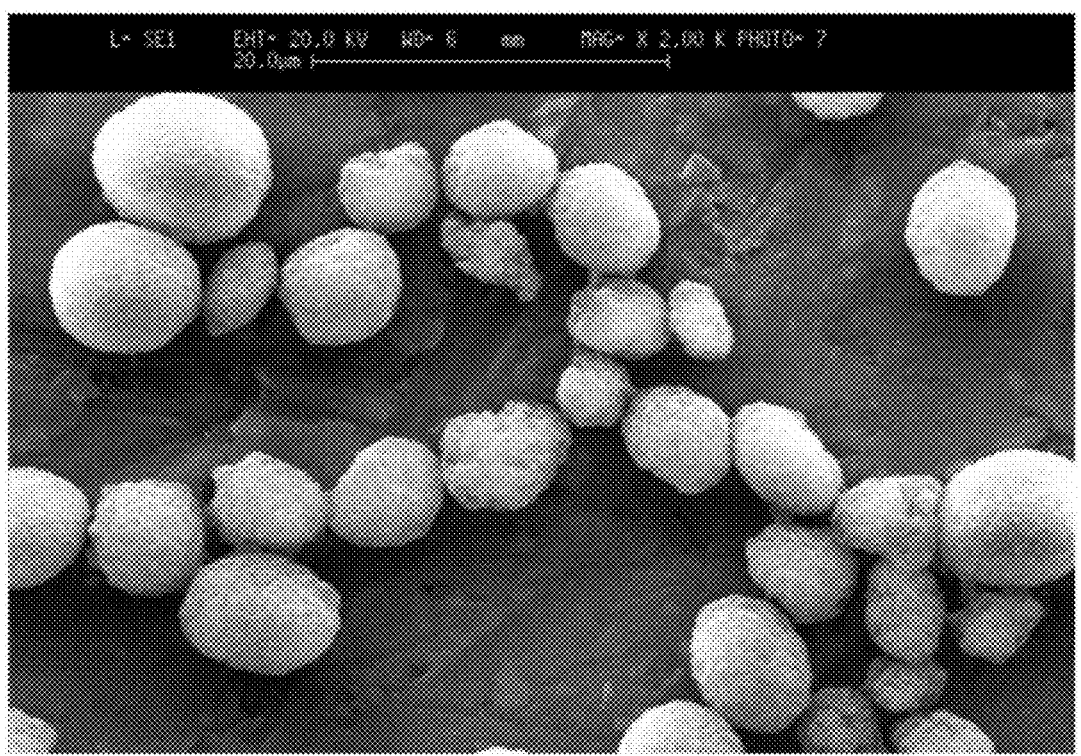
Figure 3A:
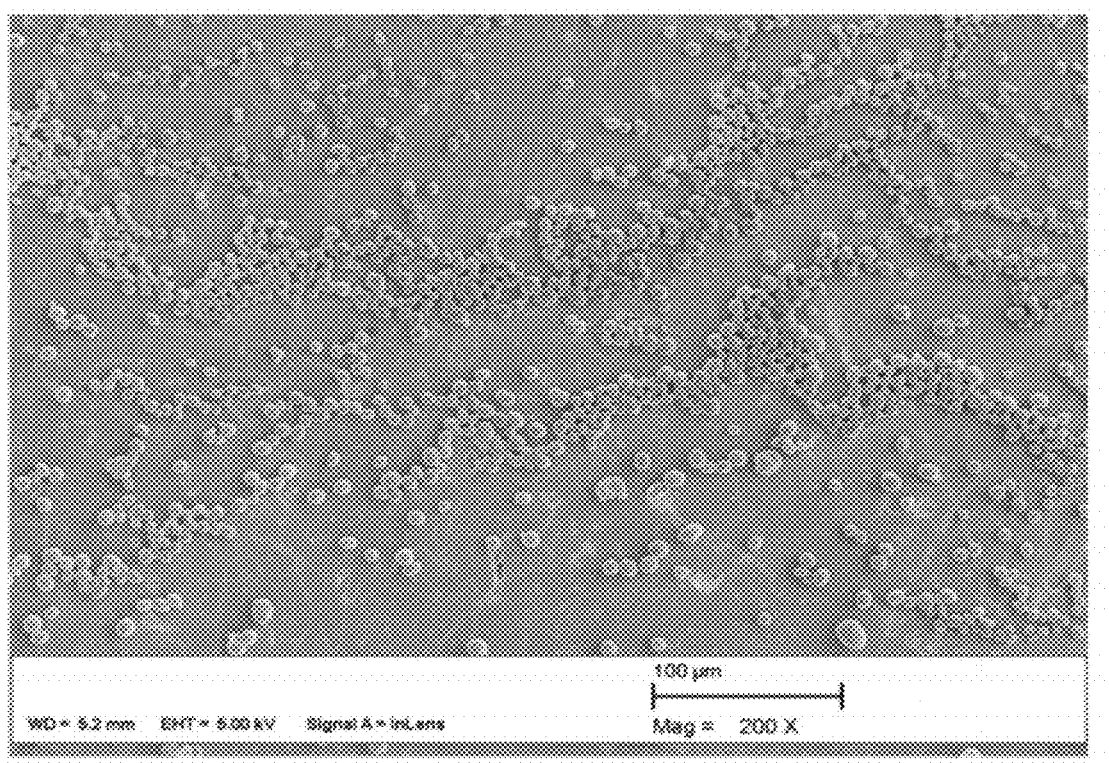
FIGS. 3A and 3B are SEM images of material prepared in accordance with various aspects of the present invention.
Figure 3B:
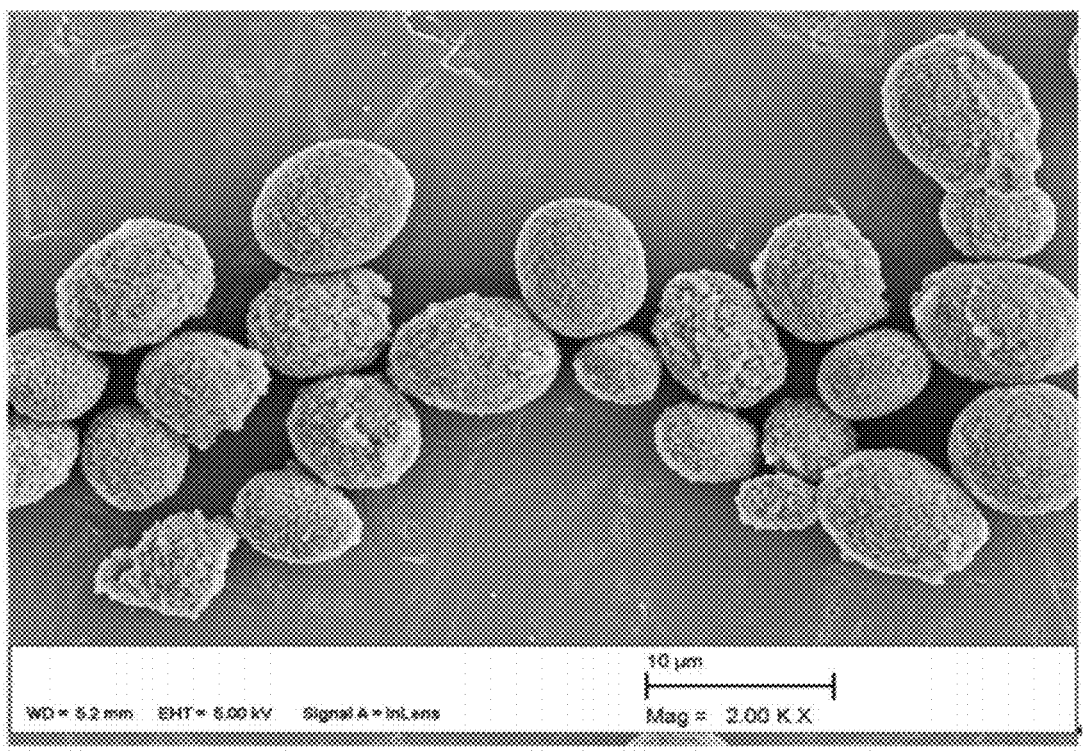
Figure 4A:
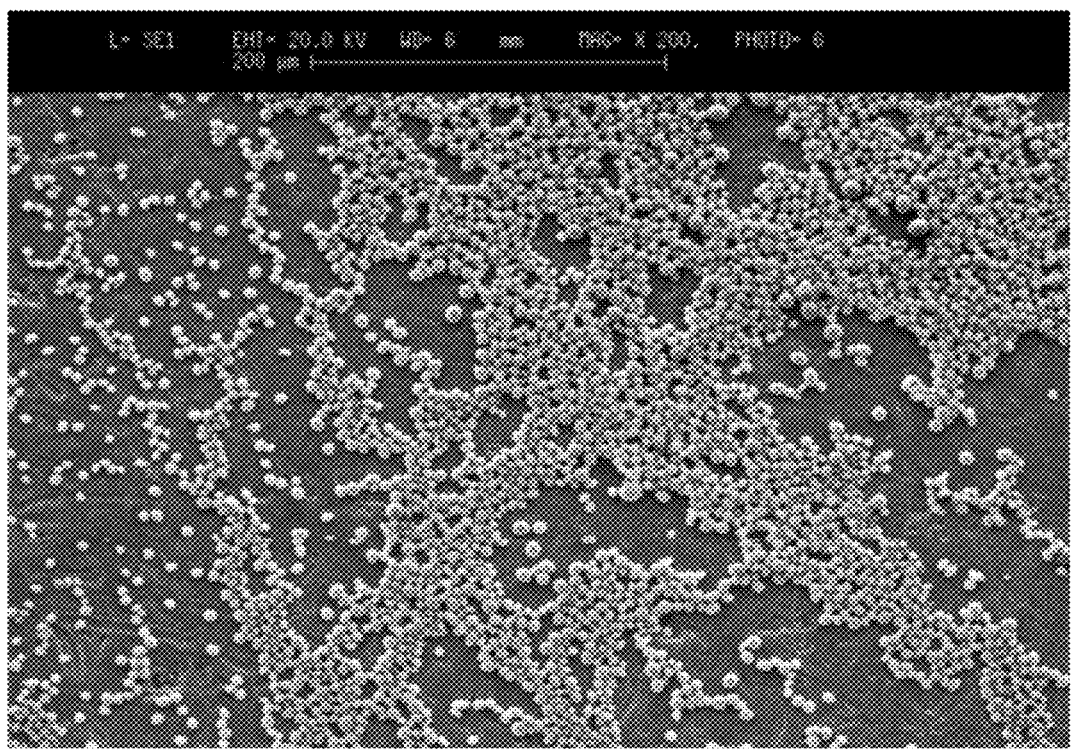
FIGS. 4A and 4B are SEM images of material prepared in accordance with various aspects of the present invention.
Figure 4B:
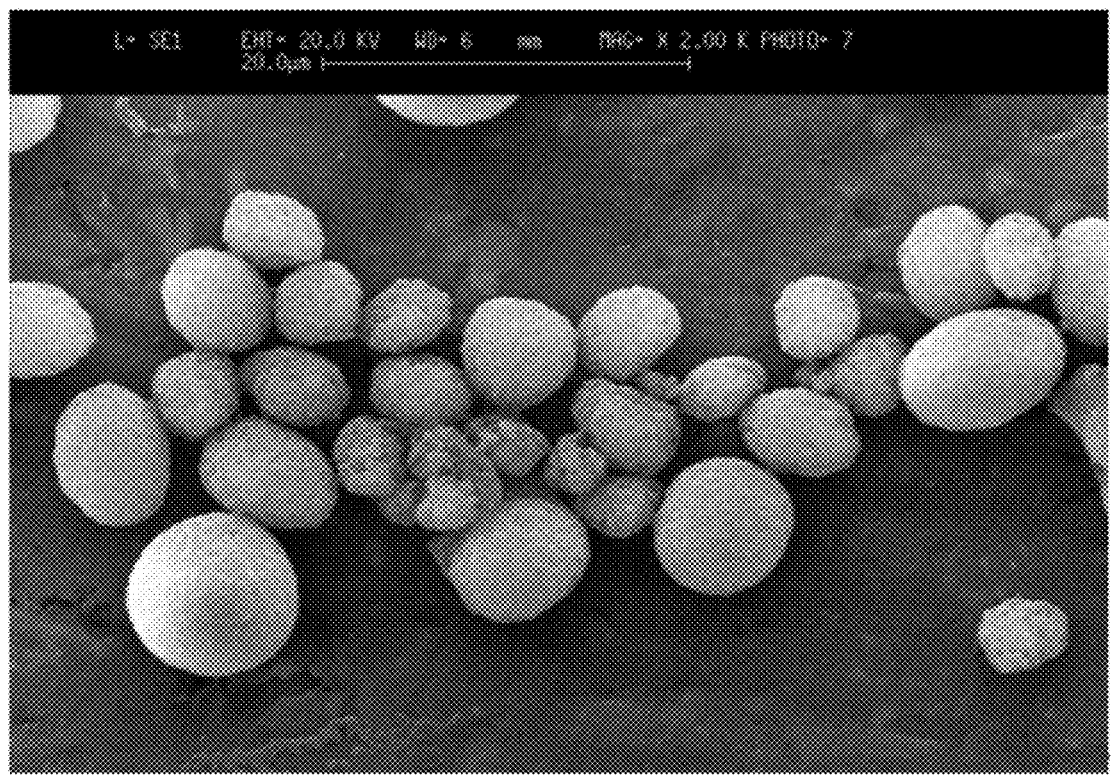
Figure 5A:
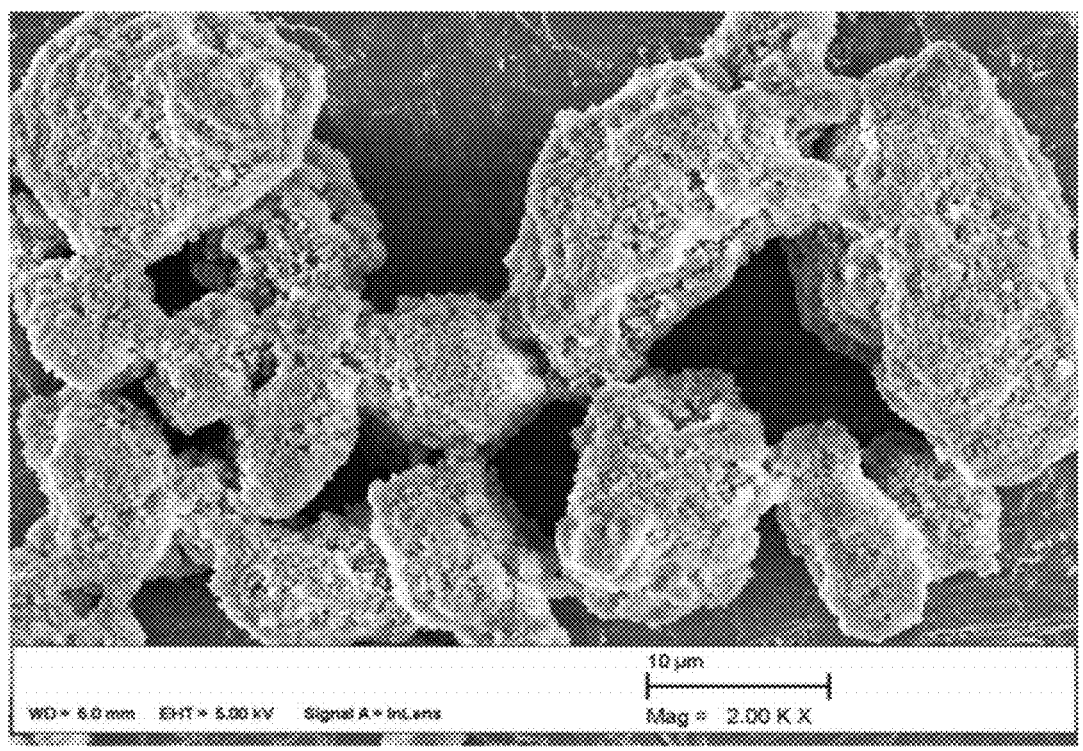
FIGS. 5A and 5B are SEM images of ZEODENT 113 and ZEODENT 165.
Figure 5B:
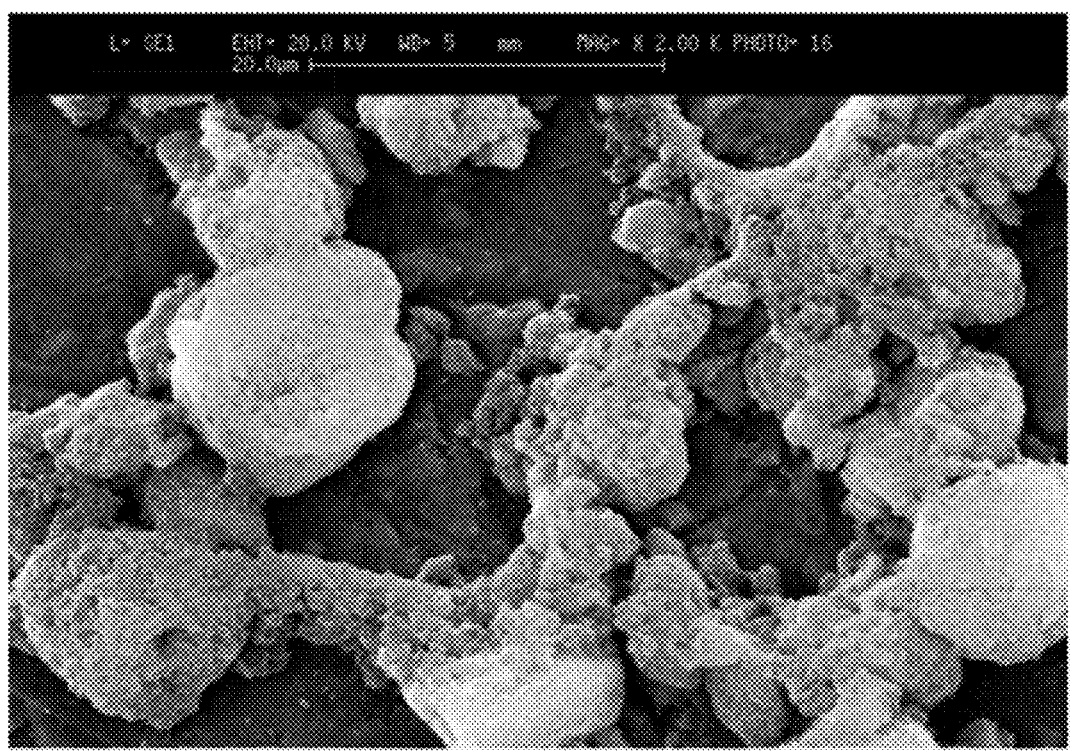

To assist in characterizing particle roundness, the standard silhouettes graph shown in FIG. 1 can be used. The particles as displayed in the magnified SEM image are compared to the standard particle roundness chart shown in FIG. 1 and classified accordingly. This process is commonly carried out in sedimentation science. As a specific example, the particles shown in FIGS. 2-4, which were prepared by the disclosed process, were classified by comparison to FIG. 1 as rounded to well-rounded in nature, meaning that at least 80% of the particles are rounded to well rounded. In contrast, the silica or silicate products shown in FIG. 5, which were prepared by a traditional batch processes, were classified by comparison to FIG. 1 as predominantly angular, sub-angular and subrounded, since flat sides and sharp, jagged edges can be observed.

The silica or silicate particles of the invention that have oil absorption values of less than 100 cc/100 g can also be characterized according to an index of roundness. As used herein "index of roundness" is defined as the ratio of the radii of curvature of the corners and edges and the radius of the maximum inscribed circle of the particle. Index of roundness can be calculated according to the following equation:

$$\text{Roundness Index} = \frac{(\sum r)/N}{R},$$

wherein r is the radius of curvature of each corner, N is the number of corners, and R is the radius of the maximum inscribed circle in the particle. Each radius of curvature, r, is calculated and summed. This value is then averaged by dividing by the number of corners. The resulting value is then divided by the radius of the maximum inscribed circle, R. This process can be carried out manually or by using commercially available graphical analysis software using an SEM image at 20,000 times magnification.

Figure 6:
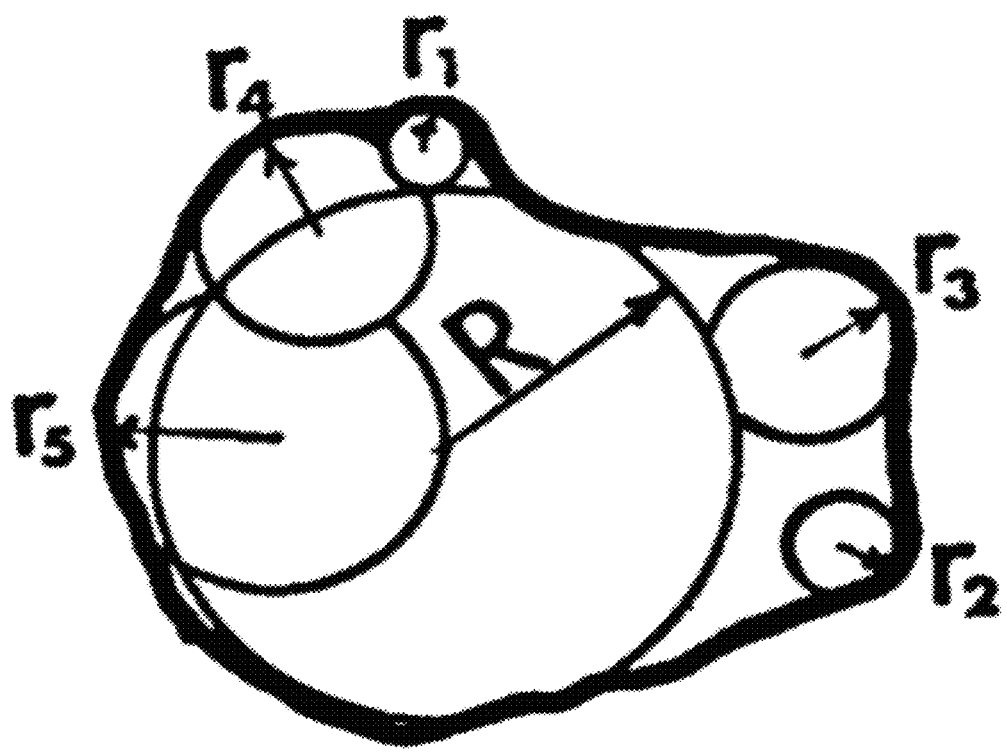
FIG. 6 is a pictorial representation for index of roundness calculations.

With reference to FIG. 6, $r_1 \ldots r_5$ are the radii of the curvature of each corner and R is the radius of the maximum inscribed circle of the particle. As an example, a perfect sphere having an average radius of curvature equal to the radius of the maximum inscribed circle, has a roundness index of 1.0. As the number of edges and faces in the particle increases, the numerator of the equation decreases, and the overall roundness of the particle decreases. Roundness is discussed in detail in "Stratigraphy and Sedimentation," $2^{nd}$ edition by Krumbein and Sloss (1963), which is incorporated herein by this reference for its teachings of roundness.

In one aspect, the silica or silicate particles of the invention that have an oil absorption value of up to 100 cc/100 g, wherein at least 80% of the silica or silicate particles have a roundness index of at least 0.8, or more preferably at least 0.9. Such silica or silicate particles also have a sphericity ($S_{80}$) factor of greater than 0.9 and a Brass Einlehner Abrasion value of less than 8.0 mg lost/100,000 revolutions. At least 80% of these particles can also be classified by comparison to the silhouettes shown in FIG. 1 as rounded to well rounded, as discussed above. The process for calculating index of roundness is as discussed above, i.e., a representative sample having preferably at least 20 particles in an SEM image magnified 20,000 times is evaluated.

The silica or silicate particles of the invention that have an oil absorption value of up to 100 cc/100 g also have a sphericity factor ($S_{80}$) of at least 0.9. As used herein, "$S_{80}$" is defined and calculated as follows. An SEM image magnified 20,000 times, which is representative of the silica or silicate particle sample, is imported into photo imaging software, and the outline of each particle (two-dimensionally) is traced. Particles that are close in proximity to one another but not attached to one another should be considered separate particles for the evaluation. The outlined particles are then filled in with color, and the image is imported into particle characterization software (e.g., IMAGE-PRO PLUS available from Media Cybernetics, Inc., Bethesda, Md.) capable of determining the perimeter and area of the particles. Sphericity of the particles can then be calculated according to the following equation.

$$\text{Sphericity} = \frac{perimeter^2}{4\pi \times area},$$

wherein perimeter is the software measured perimeter derived from the outlined trace of the particles, and wherein area is the software measured area within the traced perimeter of the particles.

The above calculation is carried out for each particle that fits entirely within the SEM image. These values are then sorted by value, and the lowest 20% of these values are discarded. The remaining 80% of these values are averaged to obtain $S_{80}$. As an example, the sphericity factor ($S_{80}$) for the particles shown in FIG. 4 was found to be 0.97.

Figure 7:
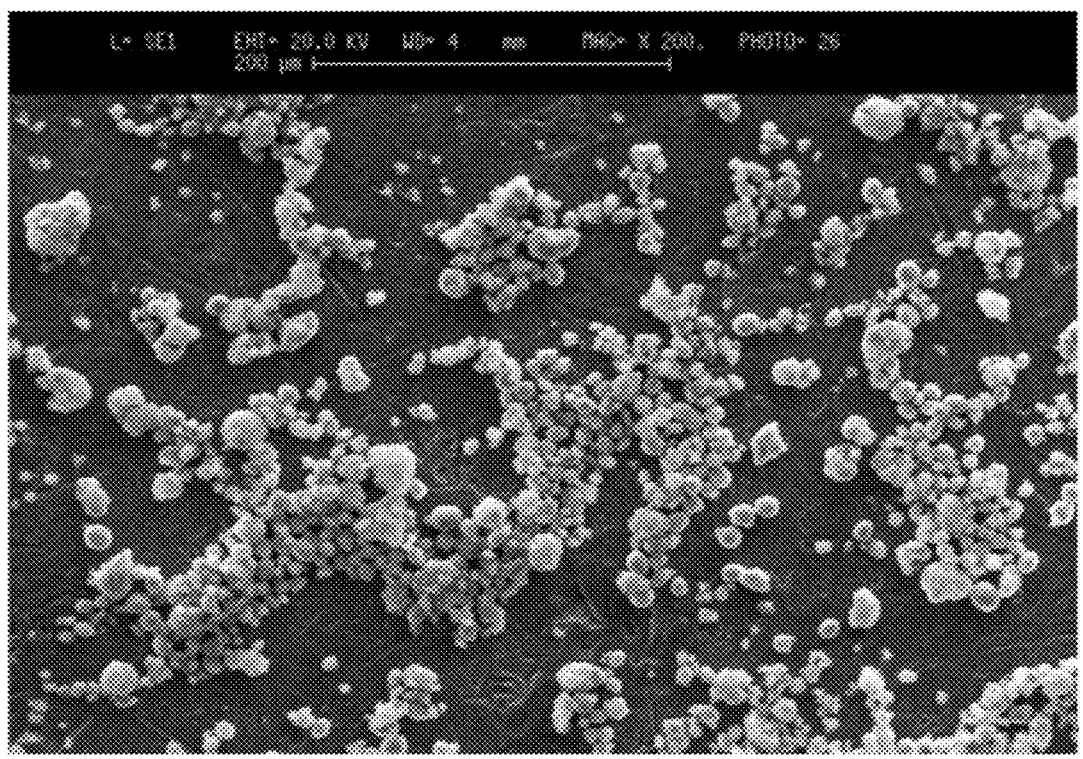
FIG. 7 is a SEM image of material prepared in accordance with various aspects of the present invention.

Silica or silicate particles with oil absorption values greater than 100 cc/100 g generally were not observed to have the same high degree of sphericity and roundness as the silica or silicate particles discussed above. However, such particles have the ability to build viscosity. An exemplary image of these particles is shown in FIG. 7.

Thus, in a further aspect, the silica or silicate particles of the invention can have an oil absorption value of greater than 100 cc/100 g. These particles may not exhibit the same roundness and sphericity as those particles discussed above, which have oil absorption values of up to 100 cc/100 g. However, the silica or silicate particles having an oil absorption value of greater than 100 cc/100 g are characterized as having a particle size of from 3 to 15 µm.

The silica or silicate particles of the invention are also characterized by a number of other properties, which are discussed below. The following characteristic properties refer to both the particles having oil absorption values up to 100 cc/100 g and greater than 100 cc/100 g, unless otherwise noted.

Median particle sizes of the silica or silicate particles of the invention were determined at various stages during the process and after or before various particle treatment steps. As used herein, median particle size, average particle size (APS), and $D_{50}$, is referred to herein as the particle size for which 50% of the sample has a smaller size and 50% of the sample has a larger size.

In one aspect, the silica or silicate particles of the invention have a median particle size while present in the liquid reaction medium of from 3 to 10 µm, preferably from 3 to 8 µm, and more preferably from 4 to 6 µm. In specific examples, the median particle size of the silica or silicate particles in the liquid reaction medium is from 5 to 6 µm. To determine median particle size of the particles in the liquid reaction medium, an aliquot of the liquid reaction medium can be removed from the recirculating reaction zone, for example through volumetric displacement, and the particles in the aliquot can be analyzed.

After discharging the silica or silicate product from the loop reaction zone and drying the silica or silicate product, but prior to any milling step, the resulting silica or silicate particles have a median particle size of from 3 to 25 µm. In some examples, the silica or silicate particles have a median particle size after drying but prior to milling of from 3 to 15 µm. In further examples, the silica or silicate particles have a median particle size after drying but prior to milling of from 4 to 8 µm.

Milling can be used to reduce the particle size of the dried silica or silicate particles, as discussed above. For example, after Raymond milling or air milling, the silica or silicate particles will generally have a median particle size of from 3 to 10 µm. In specific examples, the silica or silicate particle have a particle size after milling (including Raymond milling and/or air milling) of from 3 to 7 µm, or even from 5 to 7 µm.

Generally, it was observed that the dry particle size, sphericity, and roundness of the particles was related to the structure of the silica or silicate. As the structure was lowered, a higher percentage of well rounded/higher sphericity particles with little change to the liquid reaction medium (slurry) particle size distribution resulted upon drying. As the structure was increased, the level of well rounded particles/higher sphericity decreased, and the average particle size increased upon drying. Higher structure samples can be reduced to their slurry particle sizes with gentle Raymond milling. More intense Raymond milling and also air milling did not substantially reduce the particle size much smaller than the slurry particle size. Milling of low structure products did not result in much of a change in particle size. Structure of the silica or silicate particles generally refers to oil absorption capacity. A low structure silica or silicate therefore has low oil absorption capacity, whereas a high structure silica or silicate has a high oil absorption capacity.

Median particle size was determined using a Model LA-930 (or LA-300 or an equivalent) laser light scattering instrument available from Horiba Instruments, Boothwyn, Pa.

Generally, the silica or silicate particles of the invention have narrow particle size distributions. Particle size distribution can be evaluated based on a number of parameters, including coefficient of uniformity, coefficient of curvature, and distribution symmetry. Coefficient of uniformity (Cu) is defined as $D_{60}/D_{10}$. Coefficient of curvature (Cc) is defined as $(D_{30}/(D_{10} \times D_{60}))$. The peak symmetry can also be defined as $(D_{90}-D_{50})/(D_{50}-D_{10})$, wherein a shape value of 1.0 would represent a perfectly symmetrical curve. Coefficients of uniformity of the silica or silicate particles generally range from 1.8 to 2.5. Coefficients of curvature generally range from 0.2 to 0.31, while curve shape values generally range from 1.3 to 1.7. In specific examples, peak symmetries ranged from 1.3 to 1.5, indicating a very symmetrical distribution of silica or silicate particles.

The silica or silicate particles have water absorption values ranging from 57 to 272 cc water per 100 g of silica or silicate, although water absorption values can be made even higher. Water absorption values are determined with an Absorptometer "C" torque rheometer from C.W. Brabender Instruments, Inc. Approximately ⅓ of a cup of silica or silicate (or silicate) is transferred to the mixing chamber of the Absorptometer, and it is mixed at 150 rpm. Water then is added at a rate of 6 ml/min, and the torque required to mix the powder is recorded. As the water is absorbed by the powder, the torque will reach a maximum as the powder transforms from a free flowing powder to a paste. The total volume of water added when the maximum torque has been achieved is then standardized to the quantity of water that can be absorbed by 100 g of powder. Since the powder is used on an as received basis (it is not previously dried), the free moisture value of the powder is used to calculate a "moisture corrected water AbC value" by the following equation.

$$\text{Water Absorption} = \frac{\text{water absorbed (cc)} + \% \text{ moisture}}{(100 \text{ (g)} - \% \text{ moisture})/100}$$

The Absorptometer is commonly used to determine the oil number of carbon black in compliance with ASTM D 2414 methods B and C and ASTM D 3493.

As discussed above, in one aspect, the silica or silicate particles of the invention have oil absorption values of up to 100 cc/100 g, for example 30 to 100 cc/100 g, whereas in a further aspect, the silica or silicate particles have oil absorption values of greater than 100 cc/100 g, for example, ranging from greater than 100 cc/100 g to 150 cc/100 g. Generally, the silica or silicate particles of the invention were observed to have oil absorption capacities ranging from 30 to 171 cc ($\text{cm}^3$ or mL) of oil absorbed per 100 g of silica or silicate.

Oil absorption values were measured using the rub-out method (ASTM D281). This method is based on a principle of mixing linseed oil with silica or silicate by rubbing the linseed oil/silica or silicate mixture with a spatula on a smooth surface until a stiff putty-like paste is formed. By measuring the quantity of oil required to have a paste mixture which will curl when spread out, the oil absorption value of the silica or silicate can be calculated, which represents the volume of oil required per unit weight of silica or silicate to saturate the silica or silicate sorptive capacity. A higher oil absorption level indicates a higher structure of silica or silicate. A low value is indicative of what is considered a low-structure silica or silicate. The oil absorption value can be determined from the following equation.

$$\text{Oil Absorption} = \frac{\text{cc oil absorbed}}{\text{wt. silica (g)}} \times 100 = \frac{\text{cc oil absorbed}}{100 \text{ g silica}}$$

The silica or silicate particles of the invention generally exhibit a BET surface area ranging from 10 to 425 $\text{m}^2/\text{g}$. In specific examples, the silica or silicate particles exhibit a BET surface area ranging from 10 to 300 $\text{m}^2/\text{g}$, and preferably from 50 to 350 $\text{m}^2/\text{g}$. The BET surface areas of the disclosed silica or silicate particles was determined by the BET nitrogen adsorption method of Brunaur et al., J. Am. Chem. Soc., 60, 309 (1938), which is known in the field of particulate materials, such as silica and silicate materials.

The CTAB surface area of the disclosed silica or silicate particles generally ranges from 10 to 250 $\text{m}^2/\text{g}$, and in some examples from 50 to 200 $\text{m}^2/\text{g}$. CTAB surface area of silica or silicate is determined by absorption of CTAB (cetyltrimethylammonium bromide) on the silica or silicate surface, the excess separated by centrifugation and the quantity determined by titration with sodium lauryl sulfate using a surfactant electrode. Specifically, about 0.5 g of silica or silicate is placed in a 250-ml beaker with 100.00 ml CTAB solution (5.5 g/L), mixed on an electric stir plate for 1 hour, then centrifuged for 30 minutes at 10,000 rpm. One ml of 10% Triton X-100 is added to 5 ml of the clear supernatant in a 100-ml beaker. The pH is adjusted to 3.0-3.5 with 0.1 N HCl and the specimen is titrated with 0.0100 M sodium lauryl sulfate using a surfactant electrode (Brinkmann SUR1501-DL) to determine the endpoint.

The mercury (Hg) intruded volume of the disclosed silica or silicate particles generally ranges from 0.5 to 3 mL/g. The mercury intruded volume or total pore volume (Hg) is measured by mercury porosimetry using a Micromeritics Autopore II 9220 apparatus. The pore diameters can be calculated by the Washburn equation employing a contact angle Theta ($\Theta$) equal to 130° and a surface tension gamma equal to 485 dynes/cm. Mercury is forced into the voids of the particles as a function of pressure and the volume of the mercury intruded per gram of sample is calculated at each pressure setting. Total pore volume expressed herein represents the cumulative volume of mercury intruded at pressures from vacuum to 60,000 psi. Increments in volume ($\text{cm}^3/\text{g}$) at each pressure setting are plotted against the pore radius or diameter corresponding to the pressure setting increments. The peak in the intruded volume versus pore radius or diameter curve corresponds to the mode in the pore size distribution and identifies the most common pore size in the sample. Specifically, sample size is adjusted to achieve a stem volume of 25-75% in a powder penetrometer with a 5 mL bulb and a stem volume of about 1.1 mL. Samples are evacuated to a pressure of 50 µm of Hg and held for 5 minutes. Mercury fills the pores from 1.5 to 60,000 psi with a 10 second equilibrium time at each of approximately 103 data collection points.

An aqueous solution of the silica or silicate particles of the invention will generally exhibit a Brass Einlehner Abrasion (BEA) value of less than 10 mg lost per 100,000 revolutions, preferably less than 8 mg lost per 100,000 revolutions, and more preferably less than 5 mg lost per 100,0000 revolutions. The BEA value will typically be at least 1. Specific ranges of BEA values include 1 to 10, 1 to 8, 1 to 7, and 1 to 5 mg lost per 100,000 revolutions.

The Brass Einlehner Abrasion (BEA) test was used to measure the hardness of the silica or silicate products of the invention. Generally, the test involves an Einlehner AT-1000 Abrader used as follows: (1) a Fourdrinier brass wire screen is weighed and exposed to the action of a 10% aqueous silica or silicate suspension for a fixed number of revolutions or length of time; (2) the amount of abrasion is then determined as milligrams of brass lost from the Fourdrinier wire screen per 100,000 revolutions. Disposable supplies required for this test (brass screens, wear plates and PVC tubing) are available from Duncan Associates, Rutland, Vt. and sold as an "Einlehner Test Kit". Specifically, brass screens (Phosphos Bronze P.M.) can be prepared by washing in hot, soapy water (e.g., 0.5% Alconox) in an ultrasonic bath for 5 minutes, then rinsed in tap water and rinsed again in a beaker containing 150 ml water set in an ultrasonic bath. The screen can be rinsed again in tap water, dried in an oven set at 105° C. for 20 minutes, cooled in a desiccator and weighed. Screens can be handled with tweezers to prevent skin oils from contaminating the screens. The Einlehner test cylinder is assembled with a wear plate and weighed screen (red line side down—not abraded side) and clamped in place. The wear plate is used for about 25 tests or until worn badly; the weighed screen is used only once.

A 10% silica slurry, can be prepared by mixing 100 g silica with 900 g deionized water, and be poured into the Einlehner test cylinder. Einlehner PVC tubing can be placed onto the agitating shaft. The PVC tubing has 5 numbered positions. For each test, the position of the PVC tubing can be incremented until it has been used five times, then discarded. The Einlehner abrasion instrument can be re-assembled and the instrument set to run for 87,000 revolutions. Each test takes about 49 minutes. After the cycle is completed, the screen can be removed, rinsed in tap water, placed in a beaker containing water and set in an ultrasonic bath for 2 minutes, rinsed with deionized water and dried in an oven set at 105° C. for 20 minutes. The dried screen can then be cooled in a desiccator and reweighed. Two tests are run for each sample and the results averaged and expressed in mg lost per 100,000 revolutions. The result, measured in units of mg loss, can be characterized as the 10% brass Einlehner (BE) abrasion value.

Technidyne brightness values of the silica or silicate particles generally range from 95 to 100. In specific examples, Technidyne brightness values range from 97 to 100, or even 98 to 100. To measure brightness, fine powder silica or silicate is pressed into a smooth surfaced pellet and analyzed using a Technidyne Brightmeter S-5/BC. This instrument has a dual beam optical system where the sample is illuminated at an angle of 45°, and the reflected light is viewed at 0°. It conforms to TAPPI test methods T452 and T646, and ASTM Standard D985. Powdered materials are pressed to about a 1 cm pellet with enough pressure to give a pellet surface that is smooth and without loose particles or gloss.

Dispersions of the disclosed silica or silicate particles will generally have a refractive index (RI) value greater than 1.4. In some examples, a dispersion of the disclosed silica or silicate particles have an RI value of from 1.4 to 1.5. The dispersions generally have a % Transmission value (% T) ranging from 20 to 75.

To measure refractive index and degree of light transmission, a range of glycerin/water stock solutions (about 10) was prepared so that the refractive index of these solutions lies between 1.428 and 1.460. Typically, these stock solutions will cover the range of 70 wt % to 90 wt % glycerin in water. To determine the RI, one or two drops of each standard solution is separately placed on the fixed plate of a refractometer (Abbe 60 Refractometer Model 10450). The covering plate is fixed and locked into place. The light source and refractometer are switched on and the refractive index of each standard solution is read.

Into separate 20-ml bottles, 2.0+/−0.01 ml of the disclosed silica or silicate product was added to 18.0+/−0.01 ml of each respective stock glycerin/water solution (for products with measured oil absorption above 150, the test uses 1.0 g of disclosed silica or silicate product and 19.0 g of the stock glycerin/water solution). The bottles were then shaken vigorously to form a silica or silicate dispersion, the stoppers were removed from the bottles, and the bottles were placed in a desiccator, which was then evacuated with a vacuum pump (about 24 inches Hg).

The dispersions were then de-aerated for 120 minutes and visually inspected for complete de-aeration. The "% T" at 590 nm (Spectronic 20 D+) was measured after the samples returned to room temperature (about 10 minutes), according to the manufacturer's operating instructions. The % T was measured on the disclosed silica or silicate product by placing an aliquot of each dispersion in a quartz cuvette and reading the % T at 590 nm wavelength for each sample on a 0-100 scale. The % Transmittance vs. RI of the stock solutions was plotted on a curve. The RI of the silica or silicate was defined as the position of the plotted peak maximum (the ordinate or X-value) on the % T vs. the RI curve. The Y-value (or abscissa) of the peak maximum was the % T.

The silica or silicate particles can be filtered and washed with water to reduce the sodium sulfate levels (when present) to tolerable levels. Washing of the reaction product is generally conducted after filtering. The pH of the washed wet cake can be adjusted, if necessary, prior to proceeding to subsequent steps described herein. Sodium sulfate content of the silica or silicate particles of the invention can be up to about 6%. Sodium sulfate content was measured by conductivity of a known concentration of silica or silicate slurry. Specifically, 38 g silica or silicate wet cake sample was weighed into a one-quart mixer cup of a Hamilton Beach Mixer, model Number 30, and 140 ml of deionized water was added. The slurry was mixed for 5 to 7 minutes, then the slurry was transferred to a 250-ml graduated cylinder and the cylinder filled to the 250-ml mark with deionized water, using the water to rinse out the mixer cup. The sample was mixed by inverting the graduated cylinder (covered) several times. A conductivity meter, such as a Cole Parmer CON 500 Model #19950-00, was used to determine the conductivity of the slurry. Sodium sulfate content was determined by comparison of the sample conductivity with a standard curve generated from a known method-of-addition sodium sulfate/silica and/or silicate composition slurries, respectively.

The process discussed above for preparing the silica or silicate component of the coating compositions, in various aspects, can be carried out using a continuous loop reactor or a pipe reactor. A suitable continuous loop reactor generally comprises an inlet port for the acidulating agent, an inlet port for the alkali metal silicate, and a product discharge port all in fluid communication with a continuous loop defined by one or more pipes. The liquid medium in the continuous loop can be recirculated using a variety of means, such as a pump that is in the loop itself. Other components of the continuous loop reactor can include without limitation a heat exchanger in the loop for controlling temperature in the liquid medium, a back-pressure valve for controlling pressure, and/or an in-line mixing device in the loop for mixing the contents of the liquid reaction medium.

Figure 8:
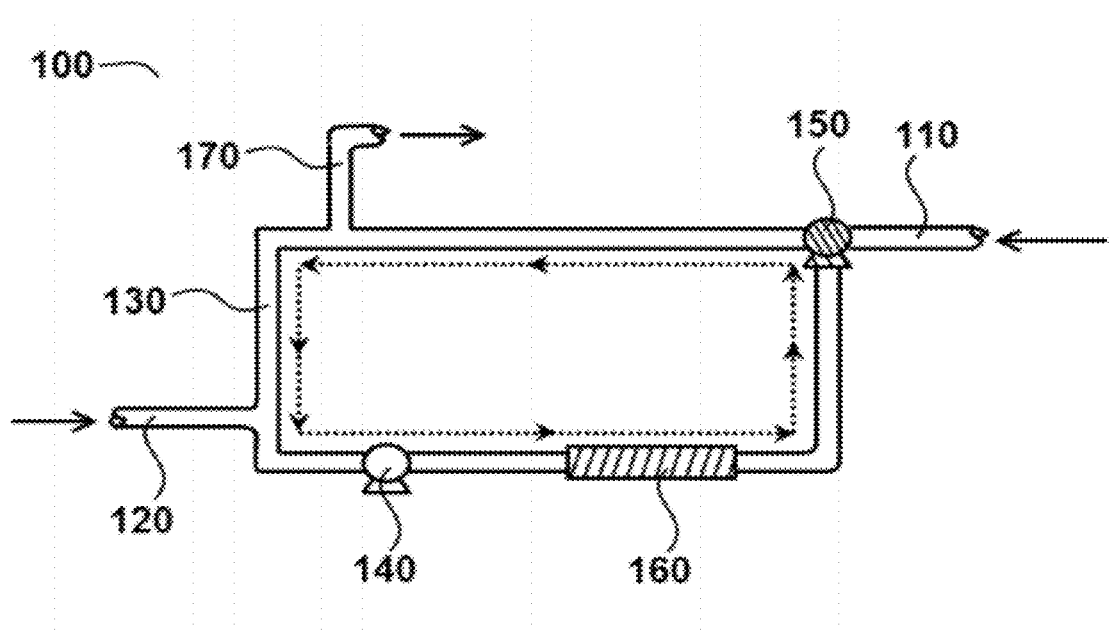
FIG. 8 is a diagram of an exemplary continuous loop reactor, in accordance with various aspects of the present invention.
Figure 9A:
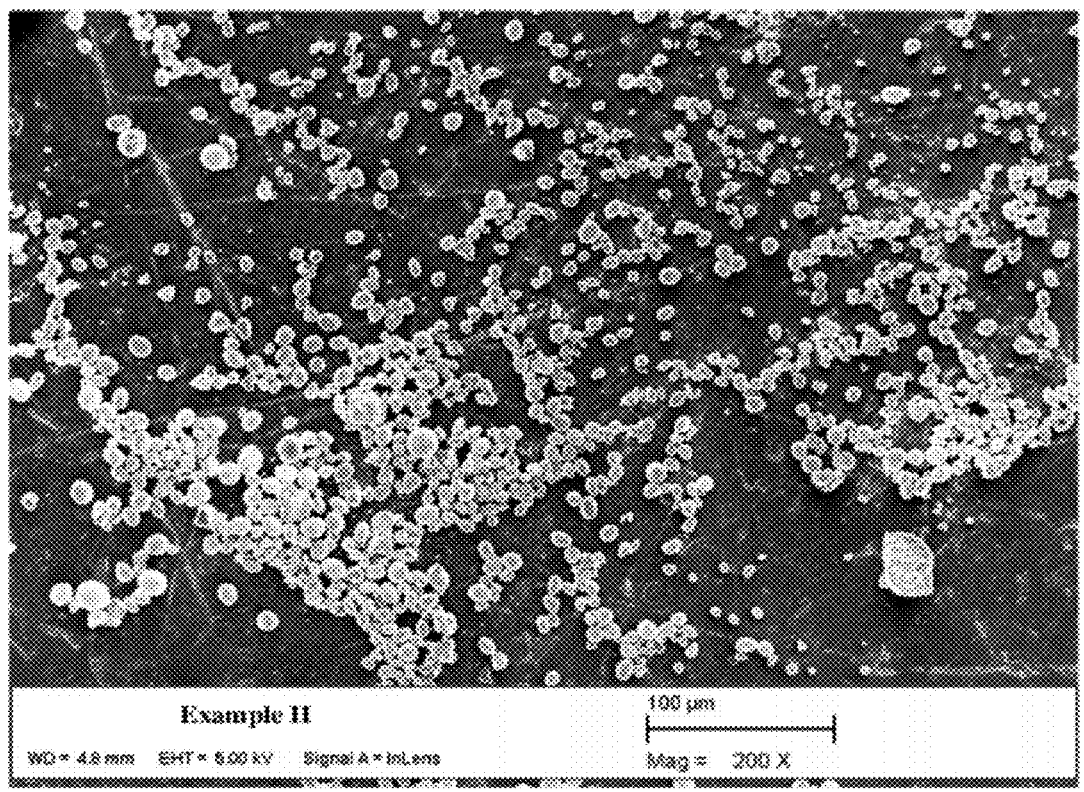
FIGS. 9A and 9B are Scanning Electron Micrographs (SEM) of the product prepared in Example 2 (II).
Figure 9B:
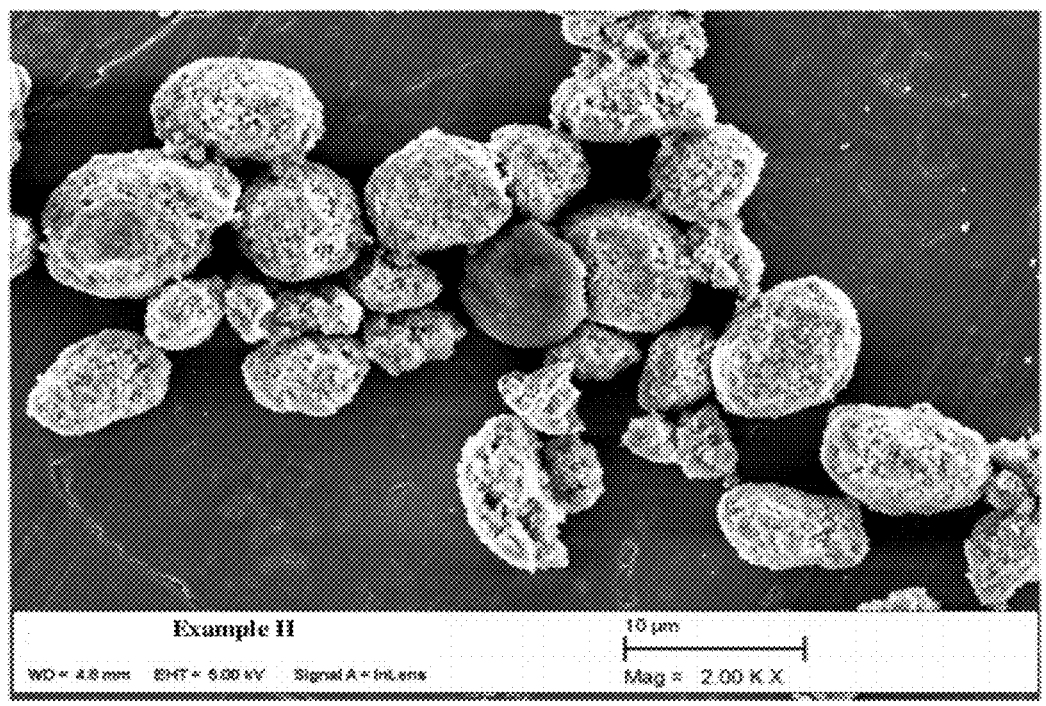
Figure 10A:
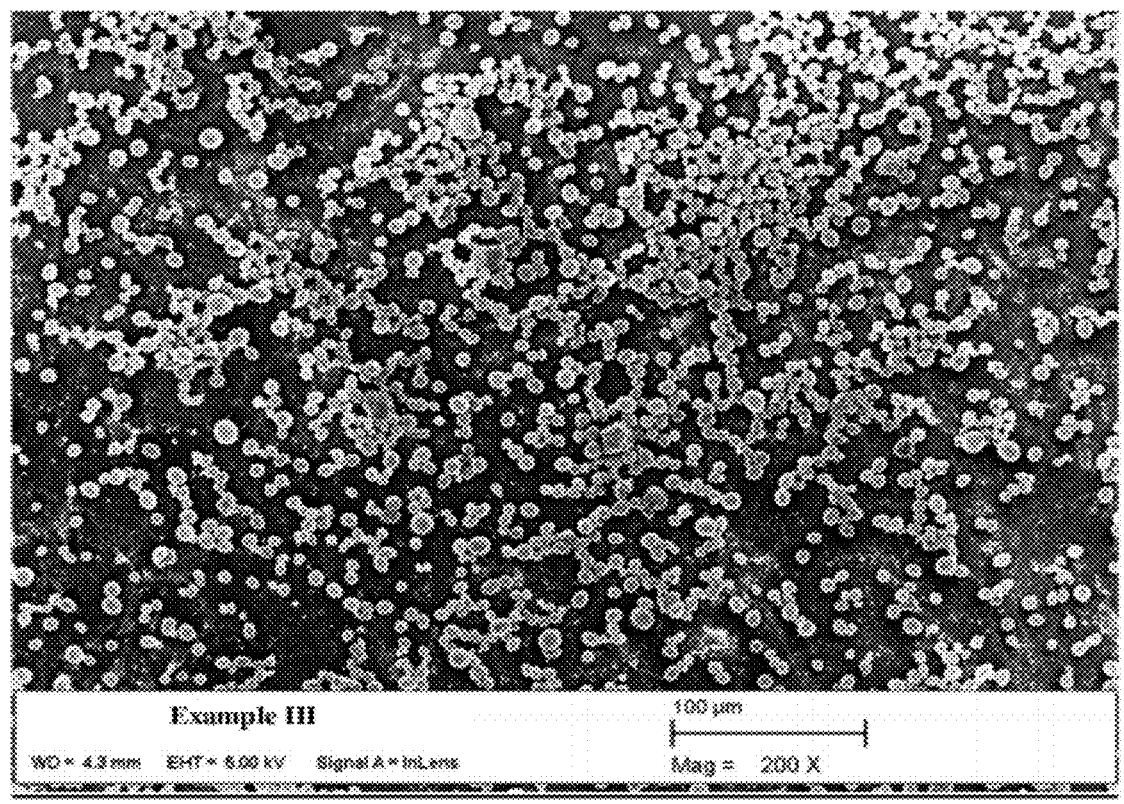
FIGS. 10A and 10B are Scanning Electron Micrographs (SEM) of the product prepared in Example 3 (III).
Figure 10B:
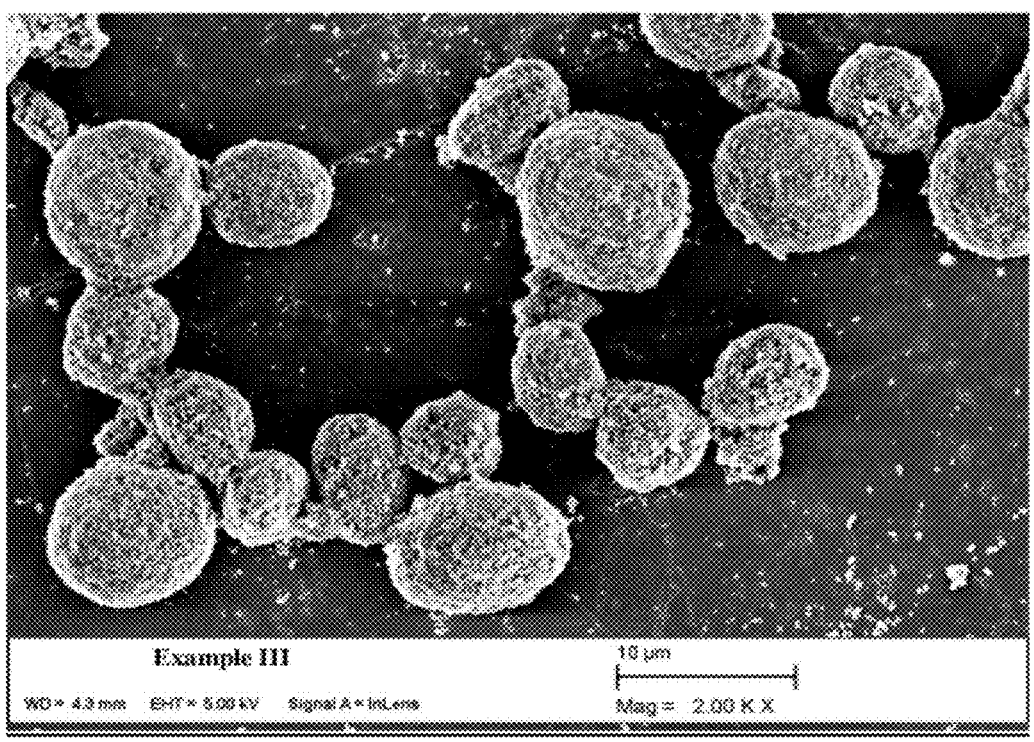
Figure 11A:
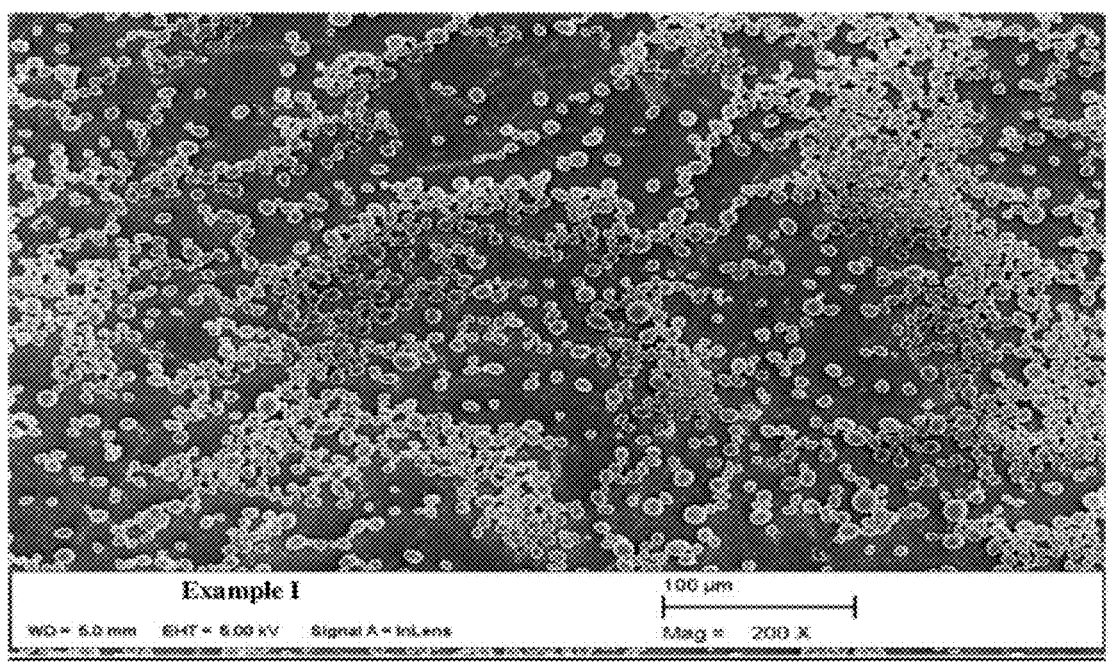
FIGS. 11A and 11B are Scanning Electron Micrographs (SEM) of the produce prepared in Example 1 (I).
Figure 11B:
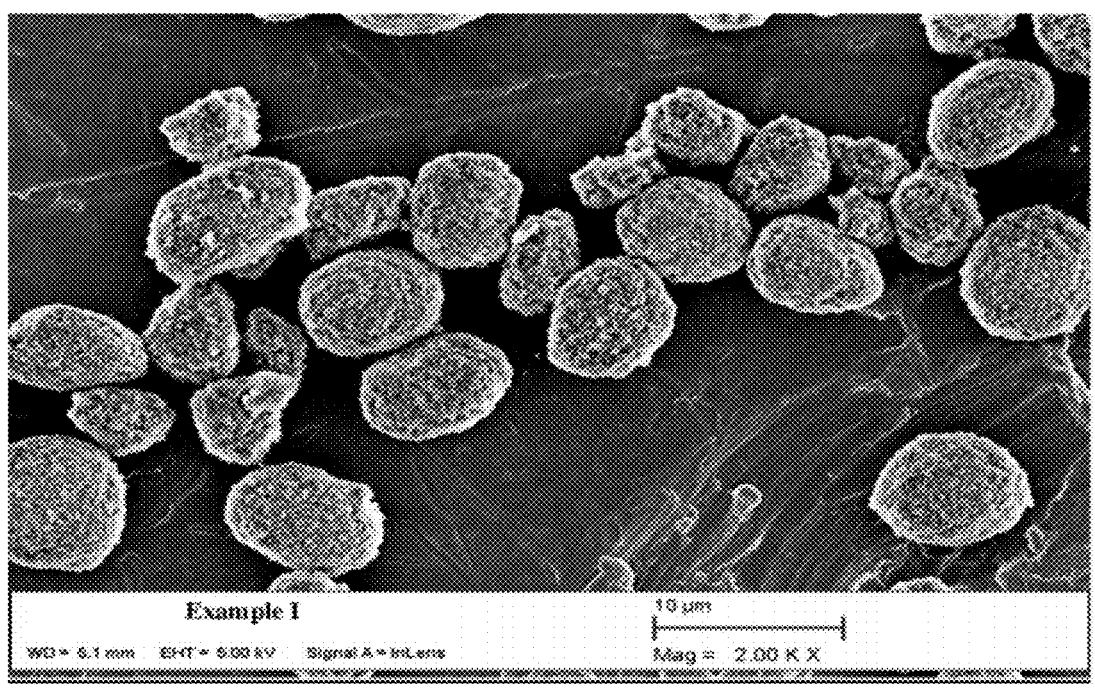

With reference to FIG. 8, an exemplary continuous loop reactor 100 comprises an acidulating agent inlet port 110 for introducing the acidulating agent into the liquid medium of the loop reaction zone and an alkali metal silicate inlet port 120 for introducing the alkali metal silicate in the loop reaction zone. The loop reaction zone is defined by one or more pipes 130 that define a continuous loop. Various other components can also be present in the continuous loop reactor 100, including a pump 140 for recirculating the liquid medium through the one or more pipes 130. During the process of the invention, the pump 140 should be in liquid communication with the liquid reaction medium. The continuous loop can also be in fluid communication with an in-line mixing device 150. In the example shown in FIG. 8, the in-line mixing device 150 is also in fluid communication with the acidulating agent inlet port, and serves to both facilitate entry of the acidulating agent into the continuous loop and also to mix the liquid medium inside the loop reaction zone. A heat exchanger 160 can also be present for controlling the temperature of the liquid medium in the continuous loop. The heat exchanger 160 is thus in thermal communication with the one or more pipes 130 that define the continuous loop. As acidulating agent, alkali metal silicate, or another liquid as discussed above, are continuously added to the reaction, the liquid medium will overflow from the continuous loop and exit the loop reaction zone through product discharge port 170. The product is then collected. In a specific aspect, the reaction can be fitted with one or more pressure controlling devices in fluid communication with the one or more pipes 130, such as a back-pressure valve (not shown) for regulating the pressure inside the loop reactor.

Any suitable pump 140 can be used with the loop reactor. The in-line mixing device 150 is used in part to provide a high shear environment to the recirculating liquid medium and is preferably is a rotor/stator type in-line mixer. Examples of useful rotor/stator mixers include SILVERSON in-line mixers, such as SILVERSON Model 450LS, manufactured by SILVERSON Machines, Inc.; or those commercially available from IKA-Works Inc., Wilmington, N.C. 28405, and from Charles Ross and Son Company, Hauppage, N.Y. 11788, including Models ME-410/420X, and 450X.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Continuous Loop Reactor

A continuous loop reactor was configured with a recycle loop wherein the reaction slurry could be circulated numerous times before it is discharged (see FIG. 8). The recycle loop comprised of sections of fixed pipe joined together by sections of flexible hose. The internal diameter of the piping/hose was approximately 1". On one side of the loop a pump was placed to circulate the reaction and on the opposite side a SILVERSON in-line mixer was installed to provide additional shear to the system and also to be used as an inlet port for introducing the acidulating agent. Between the pump and the mixer, a static mixer heat exchanger (KENICS Model 1-Pilot-HT-EX 32 available from Chemineer, Inc., Dayton, Ohio) was installed to provide a means to control the temperature during production of silica or silicate. The discharge pipe, located after the acidulating agent inlet port, allowed the product to discharge as a function of the rates at which silicate and acidulating agent are added. The discharge pipe can also be fitted with a back pressure valve that enables the reactor system to operate at temperatures greater than 100° C. The product discharge pipe can be oriented to collect product into a tank for additional modification (e.g., pH adjustment), or it can be discharged directly into a rotary or press type filter. Optionally, acid can also be added into the product discharge line to avoid post synthetic pH adjustments when product is being prepared at pH's greater than 7.0.

Silica or silicate product was prepared using the continuous loop reactor described above. Prior to the introduction of acidulating agent and alkali metal silicate into the continuous loop reactor, precipitated silica or silicate, sodium sulfate, sodium silicate, and water were first added and recirculated at 80 L/min. This is referred to herein as the liquid reaction medium, to which further acidulating agent and alkali metal silicate can be added, as discussed above. This initial step was performed to fill the recycle loop with the approximate contents and concentrations of a typical batch to thereby minimize the purging time before the desired silica or silicate product could be collected. It is believed that this step also minimizes gelation of the loop reactor contents. It should be noted, however, that acidulating agent and alkali metal silicate can be directly added to the loop reactor filled with only water without gelling or plugging the system. Thus, the liquid reaction medium can comprise water without seed silica or silicate prior to the introduction of the acidulating agent and the alkali metal silicate.

Example 1

Silica Product

A solution of 1.5 kg of ZEODENT 103, 1.34 kg of sodium sulfate, 11.1 L of sodium silicate (2.65 MR, 26.6%) and 20 L of water was prepared and added to the recirculation loop of the loop reactor and it was heated to 95° C. The contents were recirculated at 80 L/min with a SILVERSON in-line mixer operating at 60 Hz (3485 RPM). Sodium silicate (2.65 MR, 26.6%) and sulfuric acid (22.8%) were added simultaneously to the loop at a silicate rate of 1.7 L/min and an acid rate sufficient to maintain a pH of 7.5. If necessary, the acid rate was adjusted accordingly to maintain the pH. Acid and silicate were added under these conditions for 40 minutes to purge unwanted silica out of the system before the desired material was collected. After 40 minutes had passed, the collection vessel was emptied and its contents discarded. The silica product was then collected in a vessel with stirring at 40 RPM while maintaining the temperature at approximately 60° C. After the desired quantity of product was collected, addition of acid and silicate were stopped and the contents of the loop were allowed to circulate. The silica product in the collection vessel was adjusted to pH 5.0 with the manual addition of sulfuric acid and was then filtered, washed to a conductivity of ~1500 μS and was dried. After drying, the material had an average particle size of 6.7 microns.

Example 2

Silicate Product

A solution of 1.5 kg of ZEODENT 103, 1.34 kg of sodium sulfate, 11.1 L of sodium silicate (3.32 MR, 20.0%) and 20 L of water was prepared. Approximately 15.5 L of this solution was then added to the recirculation loop of the loop reactor described above and it was kept at about 24° C. The contents were recirculated at 80 L/min with a SILVERSON in-line mixer in the recirculating loop operating at 60 Hz (3485 RPM). Sodium silicate (3.32 MR, 20.0%) and aqueous aluminum sulfate (14.5%) were added simultaneously to the loop at a silicate rate of 3.4 L/min and an aluminum sulfate rate sufficient to maintain a pH of 8.5. When necessary, the acid rate was adjusted accordingly to maintain the pH. Acid and silicate were added under these conditions for 40 minutes to purge unwanted silica out of the system before the desired material was collected. After 40 minutes had passed, the collection vessel was emptied and its contents discarded. Acid and aluminum sulfate were continuously added while silicate product was collected in a vessel with stirring at 40 RPM while maintaining the temperature at approximately 60° C. After the desired quantity of product was collected, addition of aluminum sulfate and silicate was stopped. The contents of the loop were allowed to circulate. The silicate product in the collection vessel was then filtered, washed to a conductivity of approximately 1500 µS and was dried. After drying, the material was hammer milled to an average particle size of 6.4 microns.

Example 3

Silicate Product

A solution of 1.5 kg of ZEODENT 103, 1.34 kg of sodium sulfate, 11.1 L of sodium silicate (3.32 MR, 20.0%) and 20 L of water was prepared. Approximately 15.5 L of this solution was then added to the recirculation loop of the loop reactor described above with a temperature of 95° C. The contents were recirculated at 80 L/min with a SILVERSON in-line mixer in the recirculating loop operating at 80 Hz (3485 RPM). Sodium silicate (3.32 MR, 20.0%) and aqueous aluminum sulfate (14.5%) were added simultaneously to the loop at a silicate rate of 1.7 L/min and an aluminum sulfate rate sufficient to maintain a pH of 7.8. When necessary, the aluminum sulfate rate was adjusted accordingly to maintain the pH. Aluminum sulfate and silicate were added under these conditions for 40 minutes to purge unwanted silica out of the system before the desired material was collected. After 40 minutes had passed, the collection vessel was emptied and its contents discarded. Acid and aluminum sulfate were continuously added while silicate product was collected in a vessel with stirring at 40 RPM while maintaining the temperature at approximately 60° C. After the desired quantity of product was collected, addition of aluminum sulfate and silicate was stopped. The contents of the loop were allowed to circulate. The silicate product in the collection vessel was then filtered, washed to a conductivity of approximately 1500 µS and was dried. After drying, the material was hammer milled to an average particle size of 5.7 microns.

TABLE 2

Properties of Examples 1-3.

| Example | Water AbC (cc/100 g) | Oil Absorption (cc/100 g) | BET Surface Area (m²/g) | CTAB Surface Area (m²/g) | Na$_2$SO$_4$ (%) | H$_2$O (%) | Hg Intruded Volume (ml/g) | 5% pH | Median Particle Size (µm) |
|---|---|---|---|---|---|---|---|---|---|
| 1 | 58 | 32 | 32 | 20 | 1.5 | 5.2 | — | 7.8 | 6.7 |
| 2 | 158 | 105 | 286 | 182 | 1.1 | 8.4 | 1.02 | 9.6 | 6.4 |
| 3 | 75 | 62 | 33 | 26 | 0.87 | 5.4 | 0.95 | 11.0 | 5.7 |

Example 4

Interior Latex Flat Wall Paint (Formulation A)

Interior Latex Flat Wall Paint (Formulation A) was prepared using the formulation listed below.

TABLE 3

Formulation A

| Ingredient # | Component | Grams |
|---|---|---|
| 1 | Water | 8995.69 |
| 2 | Propylene Glycol (F-T Stabilizer) | 798.13 |
| 3 | Texanol (Coalescent) | 243.26 |
| 4 | Common Latex Defoamer | 61.58 |
| 5 | Polyphase BIT-20 | 61.58 |
| 6 | Igepal CTA-639W (Surfactant) | 76.98 |
| 7 | Polyacrylate Dispersant, 35% | 92.38 |
| 8 | Natrosol 250HBR | 76.98 |
| 9 | Ammonia, 28% (pH Buffer) | 15.40 |
| 10 | Tiona 595 | 3079.22 |
| 11 | Hubercarb G-325 (Coarse CaCO3) | 5822.81 |
| 12 | Silicate Product | 4618.83 |
| 13 | Water | 7185.05 |
| 14 | Kemira AMA-480 (Biocide) | 15.40 |
| 15 | Natrosol 250HBR | 123.17 |
| 16 | Colloid 643 (Defoamer) | 61.58 |
| 17 | Ammonia, 28% (pH Buffer) | 15.40 |
| 18 | Ucar 379G (Vinyl Acrylic Emulsion) | 4472.87 |
| | Totals | 35816.31 |

Master batch formulation of the above ingredients was prepared and was approximately 7 gallons in volume. To prepare Formulation A, ingredients 1-7 were premixed, then ingredient 8 was added to the mixture with continued stirring. Ingredient 9 was then added and the resultant mixture was stirred for 10 additional minutes. Ingredients 10 and 11 were then added and this was isolated as the "grind" portion of the master batch.

Ingredients 13-16 were pre-mixed and ingredient 17 was added to the mixture and stirred for 5 minutes. Ingredient 18 was finally added, and the mixture was stirred at slow speed for 15 minutes. This portion was used as the "let-down" portion of Formulation A.

Then, 71.46 grams of ingredient 12 (Silicate Product) was dispersed in 298.97 grams of the grind portion and mixed at 2200 rpm using a 1.25 inch Cowles type blade for 3 minutes. 183.97 grams of the let-down portion from above was added and the mixing continued for 10 additional minutes at 3100 rpm. The three silicate products utilized varied for formulation A samples were prepared and are summarized in the table below.

Figure 12:
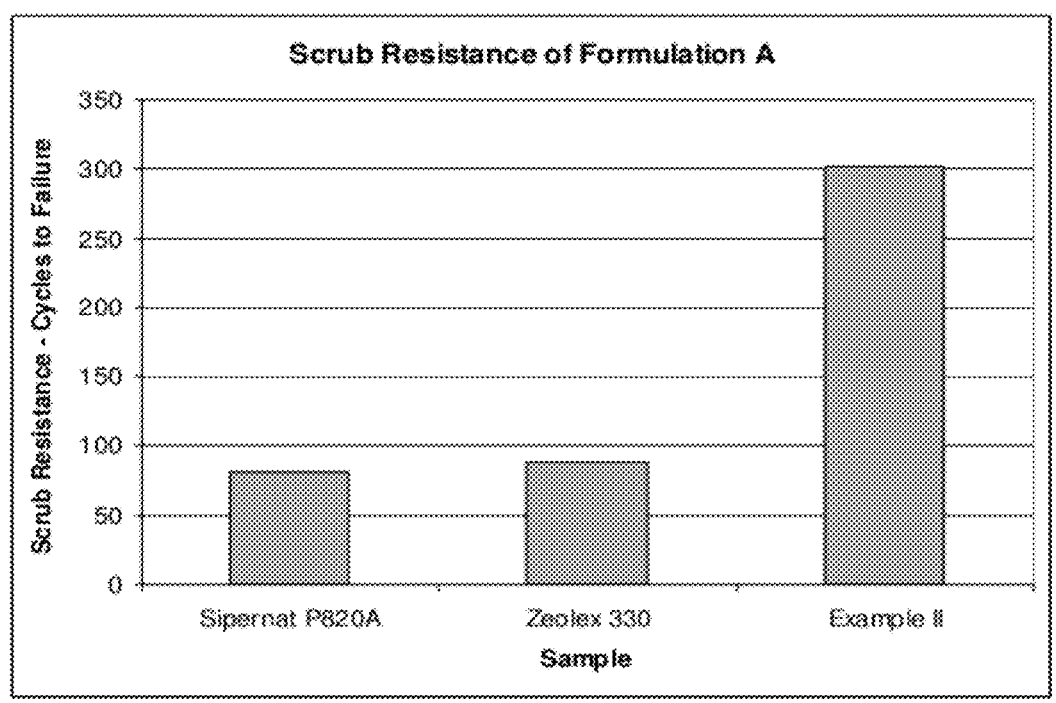
FIG. 12 is a graph showing scrub cycle results for Example 4 (comprising Example 2 (II)) and three comparison Formulations described below in Example 1 (I).

Formulation A was used to compared prepare identical comparative formulations comprising ZEOLEX 330 (J.M. Huber Corporation) and EVONIK (SIPERNAT 820A), and Example 2. The Formulation A sample comprising Example 2 demonstrated three to four times as many scrub cycles relative to the comparison formulations, under the same conditions, as shown in FIG. 12.

Sag Resistance and Flow/Leveling properties of the paints utilizing Formulation A were also measured. The inventive formulation imparted unique flow and leveling behavior that benefits the appearance properties of the applied coating. The ratio of sag resistance to flow/leveling is shown in Table 4.

TABLE 4

ASTM D2468 Abrasive Scrub Resistance Properties of Formulation A and Comparison Formulations.

| Sample ID No. | Sipernat P820A | Zeolex 330 | Formulation A |
|---|---|---|---|
| Scrub resistance (cycles to failure) | 81 | 88 | 302 |
| Krebs Viscosity - Initial - KU | 100 | 106 | 104 |
| Krebs Viscosity - 24 Hour - KU | 106 | 109 | 108 |
| pH | 9.25 | 9.60 | 9.68 |

TABLE 4-continued

ASTM D2468 Abrasive Scrub Resistance Properties of Formulation A and Comparison Formulations.

| Sample ID No. | Sipernat P820A | Zeolex 330 | Formulation A |
|---|---|---|---|
| Leveling (1-9) 1 Poor leveleing, 9 Excellent leveling | 3 | 3 | 6 |
| Sag resistance, mils | 16 | 14 | 14 |
| Sag/Leveling Ratio | 5.3 | 4.7 | 2.3 |
| Hegman Grind | 4.0 | 3.5 | 4.5 |

Example 5

Formulation B

To prepare variations of Formulation B, as detailed in Table 5, below, ingredients 1-10 were premixed. The selected silicate was substituted into the formula as ingredient 8. Ingredient 11 was then added in the appropriate amount to achieve desired consistency for processing. The mixture was ground by high speed dispersion for 15 minutes, after which the remainder of ingredient 11 was added. The resulting dispersion paste was added to a premix of ingredients 12-14 while agitating, followed by the addition ingredients 15-18.

Additional Formulation B variations were prepared and are listed in Table 5.

TABLE 5

Formulation B with varying amounts of silicate product.

| | | | Silicate Loading Level, per 100 gallons paint: | | | |
|---|---|---|---|---|---|---|
| | Raw Material | Material Description | 50 Wt % | 100 Wt % | 200 Wt % | 225 Wt % | 250 Wt % |
| 1 | Water | Water | 12.74 | 12.24 | 11.23 | 10.98 | 10.73 |
| 2 | Natrosol 250 MHR 2.5% | Cellulosic Thickener | 0.24 | 0.23 | 0.21 | 0.21 | 0.20 |
| 3 | Tamol 165A | Anionic Dispersant | 1.65 | 1.59 | 1.46 | 1.42 | 1.39 |
| 4 | Tergitol TMN-10 | Surfactant Wetting Agent | 0.21 | 0.20 | 0.18 | 0.18 | 0.17 |
| 5 | Foamaster sa-3 | Defoamer | 0.09 | 0.09 | 0.08 | 0.08 | 0.08 |
| 6 | Kathon lx 1.5% | Preservative | 0.17 | 0.16 | 0.15 | 0.14 | 0.14 |
| 7 | TiONA 595 | Titanium Dioxide | 18.73 | 17.99 | 16.52 | 16.15 | 15.78 |
| 8 | Selected Silicate Product | Silicate Filler | 4.68 | 8.44 | 15.96 | 17.84 | 19.72 |
| 9 | Diafil 525 | Diatomaceous Filler - Flattener | 0.94 | 0.90 | 0.83 | 0.81 | 0.79 |
| 10 | KaMin 70c | Calcined Clay - Filler/Opacifier | 4.68 | 4.50 | 4.13 | 4.03 | 3.94 |
| 11 | Water | Water | 7.05 | 6.77 | 6.22 | 6.08 | 5.94 |
| 12 | Water | Water | 3.53 | 3.39 | 3.11 | 3.04 | 2.97 |
| 13 | Rhoplex VSR-1050LOE | Acrylic Binder Resin (latex) | 35.12 | 33.74 | 30.97 | 30.27 | 29.58 |
| 14 | Foamaster sa-3 | Defoamer | 0.14 | 0.14 | 0.13 | 0.12 | 0.12 |
| 15 | Texanol | Ester Alcohol Coalescing Solvent | 0.37 | 0.36 | 0.33 | 0.33 | 0.32 |
| 16 | Propylene Glycol | Freeze Thaw Stabilizer | 1.14 | 1.10 | 1.01 | 0.98 | 0.96 |
| 17 | Acrysol Rm-2020 NPR | Urethane Thickener | 1.64 | 1.58 | 1.45 | 1.41 | 1.38 |
| 18 | Water | Water | 6.88 | 6.61 | 6.07 | 5.94 | 5.80 |
| | | Totals | 100.00 | 100.00 | 100.01 | 100.01 | 100.01 |

The silica materials disclosed herein have very low oil absorption versus standard products manufactured by the conventional batch process, such as ZEOLEX 80 and ZEOLEX 330. The lower oil absorption is due to particle characteristics, including particle structure, spheroid particle shape and relatively low surface area, as discussed above.

In higher VOC coatings, the binding ability and adhesion properties of the binder are enhanced using volatile organic solvents and plasticizers. VOCs soften the thermoplastic emulsion polymers (latex), which is the critical mechanism through which these binders coalesce into a continuous matrix with the suspended pigment particles. Paint films achieve their ultimate hardness upon subsequent evaporation of the solvents from the paint film.

Without the temporary plasticizing benefits of VOCs, softer binder resins are used in order to achieve the same film-forming and pigment-binding properties. Fillers with lower binder-demand require less of these plasticizing agents, which thereby reduces the VOC demand of the binder. Pigments with lower binder demand also allow the use of higher molecular weight binders that have better toughness and superior performance characteristics in the finished paint.

Figure 13:
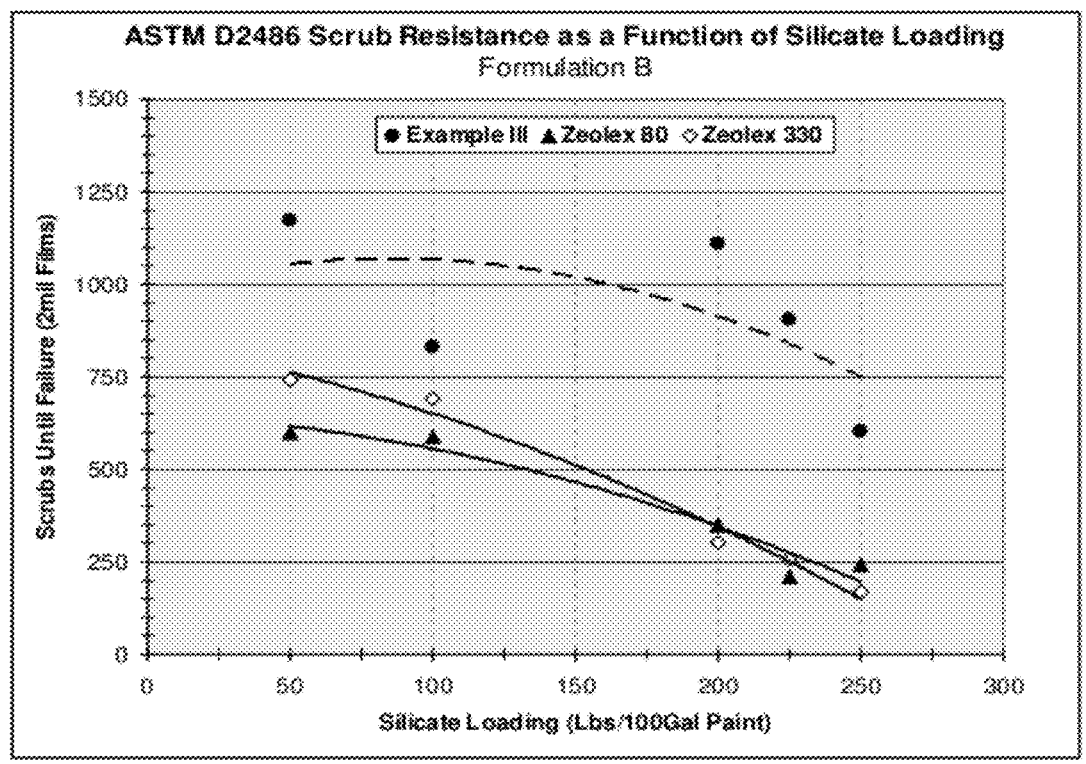
FIG. 13 is a plot of relative scrub resistance of selected silicates in Architectural Coating Example 5.

The silica and silicate coating formulations described herein enhance the properties that are compromised by soft low/zero VOC binders such as scrub resistance and burnish resistance. These properties are largely determined by the balance between the binding ability of the resin and the binder demand of the fillers, as well as the hardness and shape of the filler particles. FIG. 13 shows that the inventive silicate yields superior scrub resistance relative to the standard controls in Paint Formulation B.

Example 6

Zero VOC Coating Formulation (Formulation C)

To prepare Formulation C, ingredients 1-9 were premixed, with the selected silica or silicate product substituted into the formula as ingredient 7. The premix was then adjusted to a suitable viscosity for processing using the appropriate amount of ingredient 10. The resulting mill paste composition was ground by high speed dispersion for 15 minutes, after which the remaining portion of ingredient 10 was added. This composition was then added with agitation to a premix of ingredients 11 and 12. Ingredients 13-15 were then added.

Formulation C coatings were prepared with varying levels of silicate loading. These formulations are listed in Table 6.

TABLE 6

Formulation C having varying levels of silicate or silica.

| | Raw Material | Material Description | Silicate Loading Level, per 100 gallons paint: | | | | | |
| --- | --- | --- | --- | --- | --- | --- | --- | --- |
| | | | 50 % Wt | 100 % Wt | 200 % Wt | 225 % Wt | 250 % Wt | 300 % Wt |
| 1 | Water | Water | 12.34 | 11.69 | 10.38 | 10.05 | 9.72 | 9.07 |
| 2 | DisperBYK190 | Anionic Dispersant | 1.98 | 1.88 | 1.68 | 1.63 | 1.58 | 1.48 |
| 3 | AEPD VOX 1000 | Amine pH Adjuster | 0.23 | 0.22 | 0.19 | 0.19 | 0.18 | 0.17 |
| 4 | BYK 034 | Defoamer | 0.14 | 0.13 | 0.12 | 0.11 | 0.11 | 0.10 |
| 5 | Natrosol 250 HHR | Cellulosic Thickener | 0.21 | 0.20 | 0.17 | 0.17 | 0.16 | 0.15 |
| 6 | TiONA 595 | Titanium Dioxide | 15.86 | 15.02 | 13.33 | 12.91 | 12.49 | 11.65 |
| 7 | Selected Silica or Silicate Product | Silica or Silicate Filler | 4.67 | 7.85 | 14.20 | 15.79 | 17.38 | 20.56 |
| 8 | KaMin 70c | Calcined Clay Filler/Opacifier | 4.67 | 4.42 | 3.93 | 3.80 | 3.68 | 3.43 |
| 9 | Diafil 525 | Diatomaceous Filler - Flattener | 0.93 | 0.88 | 0.79 | 0.76 | 0.74 | 0.69 |
| 10 | Water | Water | 5.21 | 6.91 | 10.31 | 11.16 | 12.01 | 13.71 |
| 11 | Avanse 412 | Acrylic Binder Resin (latex) | 35.28 | 33.41 | 29.66 | 28.72 | 27.78 | 25.91 |
| 12 | BYK 034 | Defoamer | 0.02 | 0.02 | 0.01 | 0.01 | 0.01 | 0.01 |
| 13 | Kathon lx 1.5% | Preservative | 0.10 | 0.10 | 0.09 | 0.09 | 0.08 | 0.08 |
| 14 | Acrysol Rm-5000 | Urethane Thickener | 2.29 | 2.07 | 1.64 | 1.53 | 1.42 | 1.20 |
| 15 | Water | Water | 16.07 | 15.22 | 13.51 | 13.08 | 12.65 | 11.80 |
| | | Totals | 100.00 | 100.00 | 100.01 | 100.01 | 100.01 | 100.01 |

Formulation C is an example of a zero VOC formulation. The zero VOC system shows lower overall scrub resistance and burnish resistance versus the higher VOC example of Formulation B. In this more challenging formulation, Example 3 is able to achieve equivalent or better scrub resistance than the standard silicates Zeolex 330 and Zeolex 80 achieved in the higher VOC Formulation B.

Figure 14:
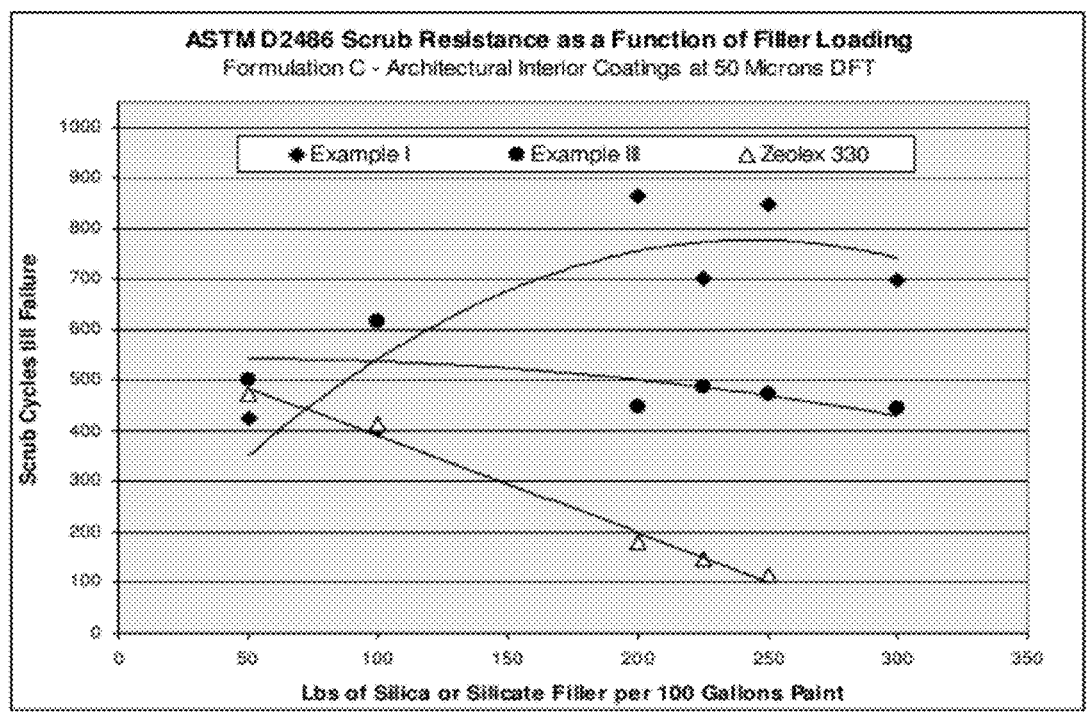
FIG. 14 is a plot of relative scrub resistance of selected silica and silicates in Zero VOC Architectural Coating Example 6.
Figure 15:
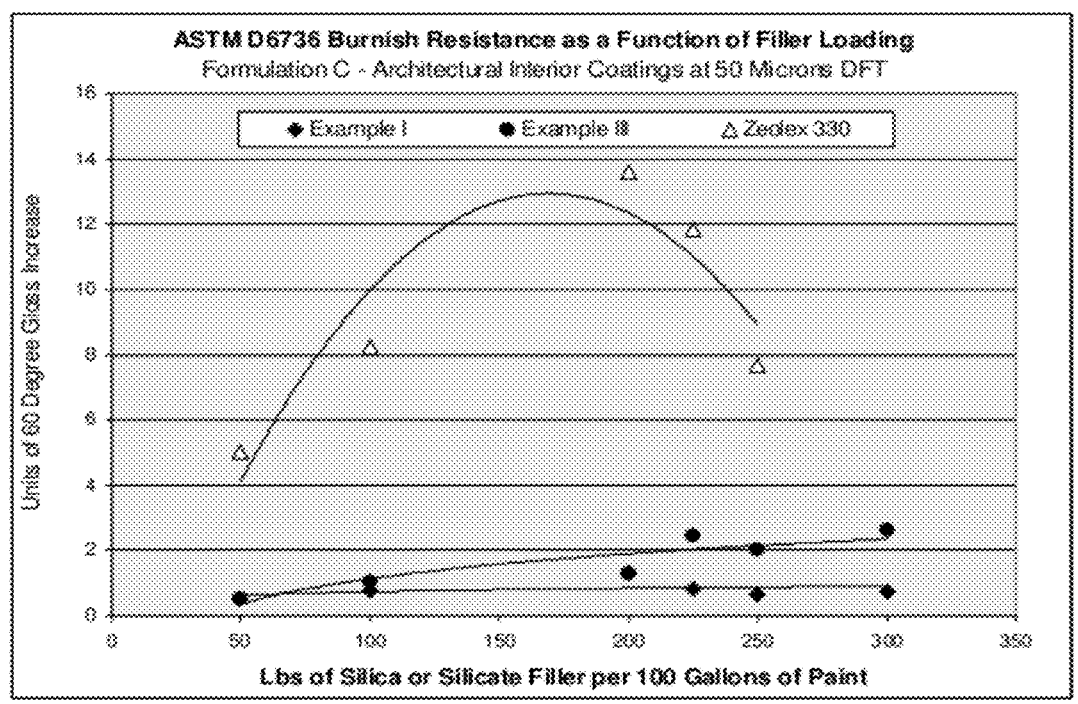
FIG. 15 is a plot of burnishing resistance as a function of silica/silicate selection and loading level in Zero VOC Architectural Coating Example 6.

Spherical silicate and silica were both tested in Formulation C versus batch-processed standard products ZEOLEX 80 and ZEOLEX 330. In this formula, the spherical silica and silicate considerably outperform the standard ZEOLEX 330 silicate in the Scrub Resistance Test. In particular, the spherical silica significantly outperforms the other materials and maintains a high level of performance across the range of loadings in the paint (FIG. 14).

Burnishing is a failure mode of low to medium gloss coatings, where silicate and silica fillers are commonly used. Burnishing is a form of physical damage to the appearance of a coating film caused by polishing or abrasive forces in the service environment. Burnishing is obvious because of the uneven gloss on the affected areas.

Burnish resistance is also a key coatings performance attribute that depends on the balance between the binder demand of the fillers and the binding capability of the binder resin. As such, burnish resistance can be especially difficult to achieve in zero VOC coatings.

The disclosed coating formulations including the inventive silica or silicate showed little or no perceptible gloss increase when burnished. The ZEOLEX 330 control paint increased by a significant margin of nearly 14 units.

The particle characteristics and relatively low surface area of the disclosed materials allows for closer particle packing. This yields a much lower dusting product that minimizes hygiene and nuisance concerns when these products are incorporated into paints.

Figure 16:
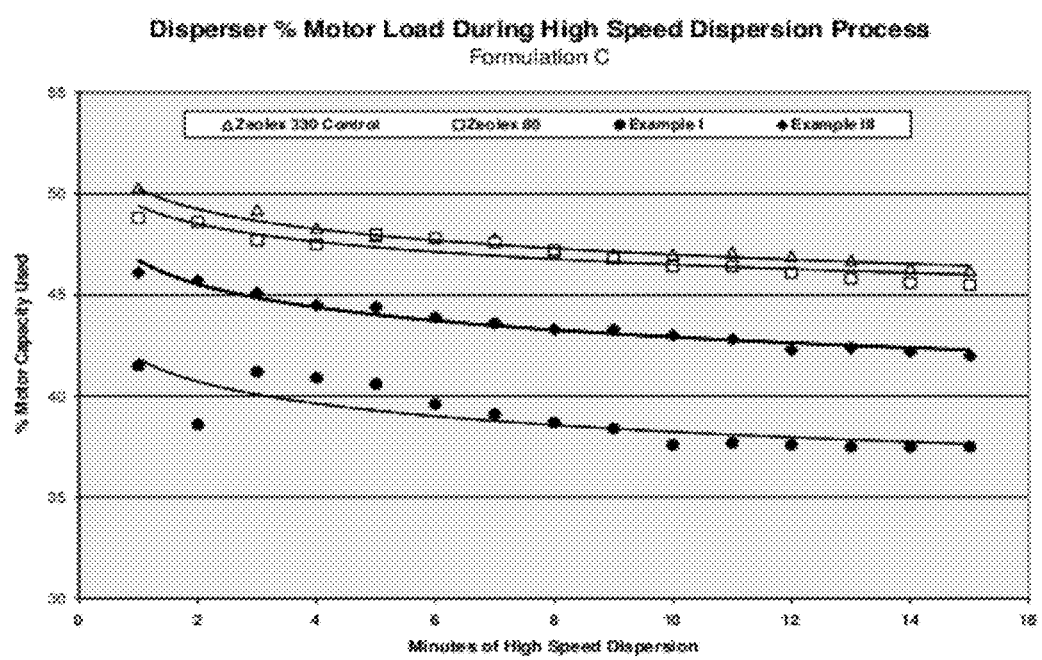
FIG. 16 is a plot of relative energy requirements of pigment dispersions using selected silica and silicates.

The particle characteristics of the disclosed silica and silicate also demonstrate easy-wetting and easy dispersing properties. The energy required to disperse the silica and silicate averaged 17.8% and 7.8% less (respectively) than the conventional technology control samples. FIG. 16 shows the % load on the dispersion motor during the minute process in the laboratory. The results are shown in Table 7.

TABLE 7

Dispersion Process Data.

| Dispersion Processing Time (min) | Dispersion Process Equipment % Load | | | | % Process Power Reduction | |
|---|---|---|---|---|---|---|
| | Zeolex 330 | Zeolex 80 | Silica Product 1 | Silicate Product 3 | Silica Product 1 | Silicate Product 3 |
| 1 | 50.3 | 48.8 | 41.5 | 46.1 | 16.2% | 7.0% |
| 2 | 48.6 | 48.6 | 38.6 | 45.7 | 20.6% | 6.0% |
| 3 | 49.2 | 47.7 | 41.2 | 45.1 | 15.0% | 6.9% |
| 4 | 48.3 | 47.5 | 40.9 | 44.5 | 14.6% | 7.1% |
| 5 | 47.9 | 48.0 | 40.6 | 44.4 | 15.3% | 7.4% |
| 6 | 47.8 | 47.8 | 39.6 | 43.9 | 17.2% | 8.2% |
| 7 | 47.8 | 47.6 | 39.1 | 43.6 | 18.0% | 8.6% |
| 8 | 47.1 | 47.2 | 38.7 | 43.3 | 17.9% | 8.2% |
| 9 | 47.0 | 46.8 | 38.4 | 43.3 | 18.1% | 7.7% |
| 10 | 47.0 | 46.4 | 37.6 | 43.0 | 19.5% | 7.9% |
| 11 | 47.1 | 46.4 | 37.7 | 42.8 | 19.4% | 8.4% |
| 12 | 46.9 | 46.1 | 37.6 | 42.3 | 19.1% | 9.0% |
| 13 | 46.7 | 45.8 | 37.5 | 42.4 | 18.9% | 8.3% |
| 14 | 46.3 | 45.6 | 37.5 | 42.2 | 18.4% | 8.2% |
| 15 | 46.2 | 45.5 | 37.5 | 42.0 | 18.2% | 8.4% |
| Average Reduction in Power Demand | | | | | 17.8% | 7.8% |

The millbase formulations for these dispersions each require a certain amount of water for the proper rheological consistency for efficient processing. Water levels were adjusted in process for the test dispersions in a manner consistent with industry standards. The total water required to disperse the materials is lower than the standard products. Moreover, the reduced power demand was observed in conjunction with the reduced water amounts in the mill paste formulations.

Although there is a significant difference in oil absorption between the inventive silica and silicate and the standard control materials, the processing benefits were shown to be more specifically related to the unique particle characteristics of the inventive silica and silicate by comparing to a conventionally manufactured silica product with similar oil absorption. A sample of silica was prepared for this purpose by air milling an available commercial product, Zeodent 109, to mean particle size of 5 microns with oil absorption of 60 g/cc. This material was added into Formula B as item 8, in place of the selected silica product. Upon addition, the viscosity increased so significantly that a paint could not be prepared. This is clearly in contrast to the results with the innovative silica and silicate results, in which the viscosity was actually much lower than anticipated.

TABLE 8

Dispersion Process Water Requirement and Rheological Data.

| Silica/Silicate | Grams of Water Required | Spindle | Brookfield Viscosity when Properly Adjusted for Process | | Brookfield Viscosity at Equivalent Wt. Solids (49.5%) | | % Water Reduction in Millbase* |
|---|---|---|---|---|---|---|---|
| | | | 2.5 rpm | 20 rpm | 2.5 rpm | 20 rpm | |
| Zeolex 330 | 196.22 | 7 | 240000 | 74000 | 240000 | 74000 | |
| Zeolex 80 | 185.21 | 7 | 240000 | 74000 | 224000 | 62000 | |
| Silica Product 1 | 65.85 | 6 | 86000 | 33500 | 9800 | 3900 | 65.47% |
| Silicate Product 3 | 58.38 | 6 | 106000 | 29750 | 5800 | 2575 | 69.39% |

*Versus the average water requirement of the Zeolex 330 and Zeolex 80 control samples.

The disclosed materials consume less clean water to process, which minimizes the net environmental impact and also reduces the volume requirement of the millbase in the process vessel. Combined with the reduced power demand, this will enable coatings producers to approximately double their production throughput using the same process assets.

Paint manufacture uses water for a number of other important purposes aside from its more obvious role as a dispersion vehicle. Water is needed throughout the manufacturing processes to flush transfer lines, wash equipment and to prevent the formation of coagulated materials on the equipment. This is a major challenge for Process Engineers due to the fact that there is only a limited amount of water in the paint formulas that can be dedicated for processing needs. Thus, the unusually low water demand of the disclosed materials is an advantage from a process engineering perspective. By providing greater flexibility to incorporate process water into the paint formula, paint producers have the ability to run more efficiently, with less rework and with less waste water.

Various modifications and variations can be made to the compounds, composites, kits, articles, devices, compositions, and methods described herein. Other aspects of the compounds, composites, kits, articles, devices, compositions, and methods described herein will be apparent from consideration of the specification and practice of the compounds, composites, kits, articles, devices, compositions, and methods disclosed herein. It is intended that the specification and examples be considered as exemplary.

What is claimed is:

1. An architectural coating composition comprising precipitated silica or silicate particles having an oil absorption value of up to 100 cc/100 g and a mercury intruded volume of from 0.5 ml/g to 3 ml/g; wherein at least 80% of the silica particles are rounded to well rounded; and wherein the silica particles have a sphericity ($S_{80}$) factor of greater than 0.9 and a Brass Einlehner Abrasion value of at least 1 to less than 8.0 mg lost/100,000 revolutions.

2. The composition of claim 1, further comprising at least one of water, propylene glycol, a binder, a stabilizer, a coalescent, a defoamer, a surfactant, a dispersant, a pH buffer, calcium carbonate, a biocide, an acrylic emulsion, or a combination thereof.

3. The composition of claim 1, which is free of, or has reduced levels of volatile organic content, alkylphenol ethoxylates, or both.

4. The composition of claim 1, wherein the precipitated silica particles have a water absorption value from 57 to 158 cc water per 100 g of precipitated silica.

5. The composition of claim 1, wherein the precipitated silica particles have a BET surface area from 10 $m^2/g$ to 425 $m^2/g$.

6. The composition of claim 1, wherein the precipitated silica particles have a BET surface area from 50 $m^2/g$ to 350 $m^2/g$.

7. The composition of claim 1, wherein the precipitated silica particles have a CTAB surface area from 10 $m^2/g$ to 250 $m^2/g$.

8. The composition of claim 1, wherein the precipitated silica particles have a CTAB surface area from 50 $m^2/g$ to 200 $m^2/g$.

9. The composition of claim 1, wherein the precipitated silica particles have an oil absorption value of from 30 up to 100 cc/100 g.

10. The composition of claim 1, wherein the precipitated silica particles have a Technidyne brightness value from 95 to 100.

11. The composition of claim 1, wherein the precipitated silica particles have a Technidyne brightness value from 97 to 100.

12. The composition of claim 1, wherein a dispersion of the precipitated silica particles has a refractive index greater than 1.4.

13. The composition of claim 1, wherein a dispersion of the precipitated silica particles has a refractive index from 1.4 to 1.5.

14. The composition of claim 1, wherein the precipitated silica particles have one or more of: a coefficient of uniformity from 1.8 to 2.5; a coefficient of curvature from 0.2 to 0.31; or a curve shape from 1.3 to 1.7.

15. An architectural coating composition comprising precipitated silicate particles having an oil absorption value of up to 100 cc/100 g and a mercury intruded volume of from 0.5 ml/g to 3 ml/g; wherein at least 80% of the silicate particles are rounded to well rounded; and wherein the silicate particles have a sphericity ($S_{80}$) factor of greater than 0.9 and a Brass Einlehner Abrasion value of at least 1 to less than 8 mg lost/100,000 revolutions.

16. The composition of claim 15, further comprising at least one of water, propylene glycol, a binder, a stabilizer, a coalescent, a defoamer, a surfactant, a dispersant, a pH buffer, calcium carbonate, a biocide, an acrylic emulsion, or a combination thereof.

17. The composition of claim 15, wherein the precipitated silicate particles have a water absorption value from 57 to 158 cc water per 100 g of precipitated silicate.

18. The composition of claim 15, wherein the precipitated silicate particles have a BET surface area from 10 $m^2/g$ to 425 $m^2/g$.

19. The composition of claim 15, wherein the precipitated silicate particles have a BET surface area from 10 $m^2/g$ to 300 $m^2/g$.

20. The composition of claim 15, wherein the precipitated silicate particles have a CTAB surface area from 10 $m^2/g$ to 250 $m^2/g$.

21. The composition of claim 15, wherein the precipitated silicate particles have an oil absorption value of from 30 up to 100 cc/100 g.

22. The composition of claim 15, wherein the precipitated silicate particles have a Technidyne brightness value from 95 to 100.

23. The composition of claim 15, wherein a dispersion of the precipitated silicate particles has a refractive index from 1.4 to 1.5.

24. The composition of claim 15, wherein the precipitated silicate particles have one or more of: a coefficient of uniformity from 1.8 to 2.5; a coefficient of curvature from 0.2 to 0.31; or a curve shape from 1.3 to 1.7.

* * * * *